United States Patent [19]

Markhasin et al.

[11] 4,413,341

[45] Nov. 1, 1983

[54] METHOD FOR EXCHANGE OF DATA BETWEEN CENTRAL STATION AND PERIPHERAL STATIONS

[76] Inventors: Alexandr B. Markhasin, ulitsa Krylova, 41, kv. 22; Gennady V. Belyaev, ulitsa Nikitina, 68, kv. 20; Jury V. Babushkin, ulitsa Turgeneva, 223, kv. 21; Alexandr K. Petrov, ulitsa Vystavochnaya, 11, kv. 51, all of Novosibirsk, U.S.S.R.

[21] Appl. No.: 267,338

[22] Filed: May 26, 1981

Related U.S. Application Data

[62] Division of Ser. No. 46,640, Jun. 8, 1979.

[51] Int. Cl.³ .......................... G06F 11/00; H04J 6/00
[52] U.S. Cl. ............................... 371/72; 340/825.07; 340/825.7; 364/900; 370/92; 375/107
[58] Field of Search ... 364/200 MS File, 900 MS File; 375/106, 107; 370/85, 92, 93, 94; 340/825, 825.7, 825.07; 371/72

[56] References Cited

U.S. PATENT DOCUMENTS

| | | | |
|---|---|---|---|
| 3,303,476 | 2/1967 | Moyer et al. | 364/200 |
| 3,573,740 | 4/1971 | Berger | 364/200 |
| 3,633,169 | 1/1972 | Bickford | 364/200 |
| 3,639,694 | 2/1972 | Deutsch | 364/200 |
| 3,680,053 | 7/1972 | Cotton et al. | 364/200 |
| 3,725,871 | 4/1973 | Heuttner et al. | 364/200 |
| 3,793,488 | 2/1974 | King | 370/85 |
| 3,882,465 | 5/1975 | Cook et al. | 340/825.07 |
| 4,019,176 | 4/1977 | Cour et al. | 364/900 |
| 4,063,038 | 12/1977 | Kaul et al. | 370/92 |
| 4,100,601 | 7/1978 | Kaufman et al. | 364/200 |

FOREIGN PATENT DOCUMENTS

| | | |
|---|---|---|
| 2226778 | 4/1975 | Fed. Rep. of Germany . |
| 215294 | 4/1968 | U.S.S.R. . |
| 478346 | 7/1975 | U.S.S.R. . |

*Primary Examiner*—Eddie P. Chan
*Attorney, Agent, or Firm*—Steinberg & Raskin

[57] ABSTRACT

Modulation patterns and parameters are provided at the central station to form elementary signals of addresses of the peripheral stations from the elements of an address subsequence generated at the central station. Different modulation patterns and parameters formed from the elements of data are provided at the central station to form elementary data signals and elementary address signals. The elementary address signals and elementary data signals of a given peripheral station are successively transmitted from the central station. The availability of data for transmission is determined at the central station by setting intervals of time between successive elementary address signals depending on the availability of data for transmission from a given peripheral station to the central station and from the central station to a given peripheral station.

9 Claims, 25 Drawing Figures

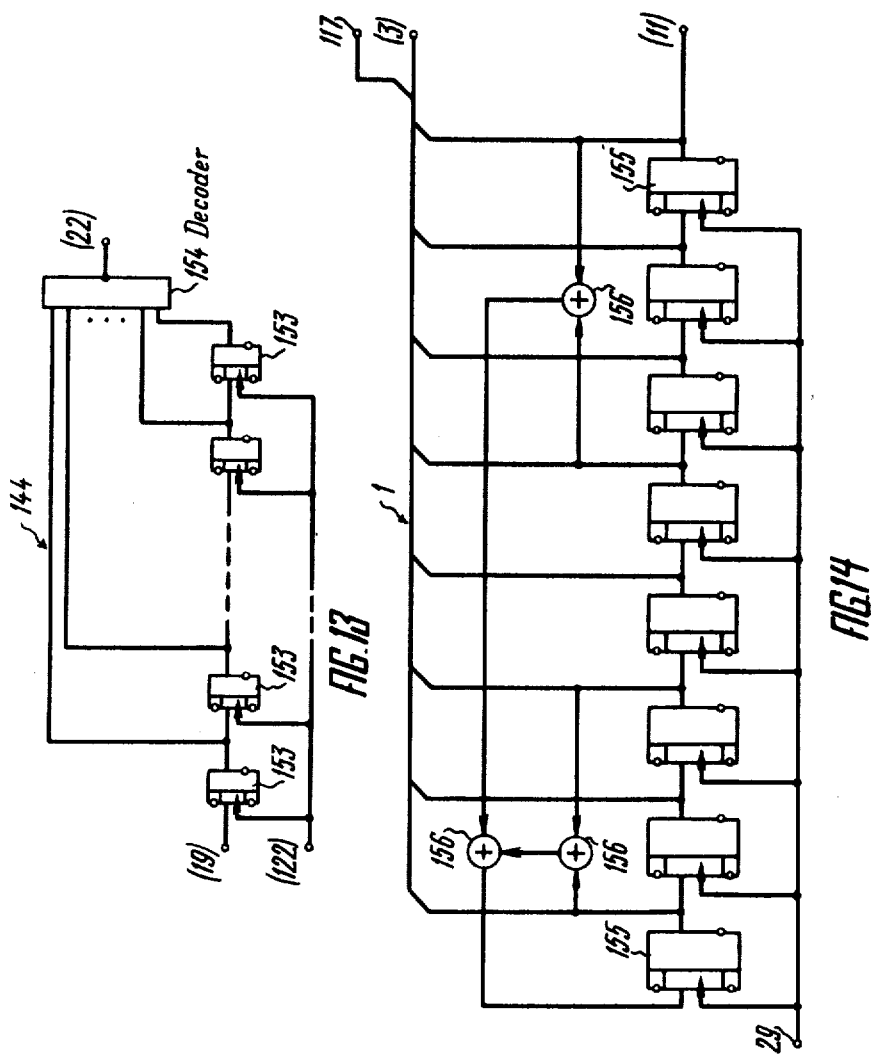

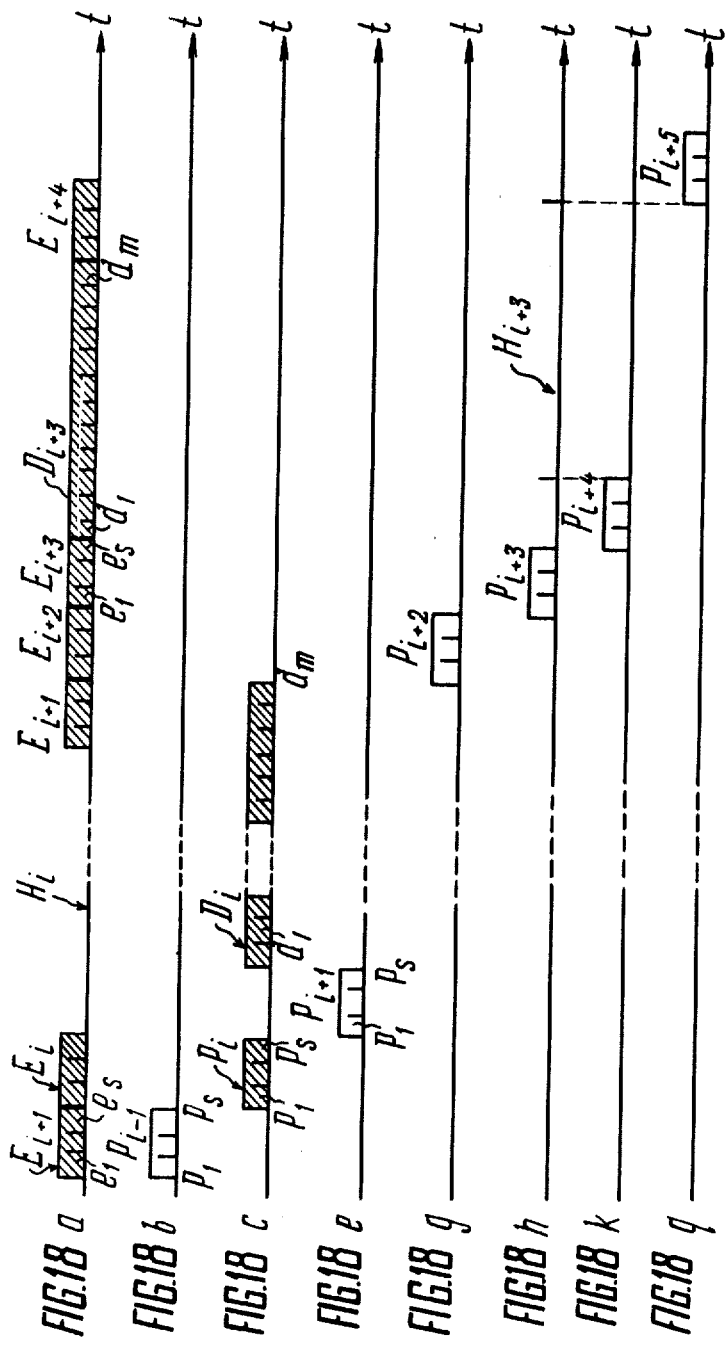

METHOD FOR EXCHANGE OF DATA BETWEEN CENTRAL STATION AND PERIPHERAL STATIONS

This is a division, of application Ser. No. 46,640, filed June 8, 1979.

FIELD OF THE INVENTION

The present invention relates to data transmission systems and, more particularly, to a method for an exchange of data between a central station and peripheral stations through multiplex channels and to a system for effecting same.

The invention is applicable to the real-time exchange of data through multiplex channels, that is, channels operating in the multiplex mode, between a central station and a plurality of remote, scattered and mobile peripheral stations. The invention is also applicable to access networks, as well as automatic control, monitoring and dispatching systems of different classes.

BACKGROUND OF THE INVENTION

There are known methods and systems for real-time transfer of data between a central station and a plurality of peripheral stations, which are based on the utilization of multiplex communication channels. The major disadvantage of such methods and systems is a low channel utilization factor, keeping in mind that the throughput of a channel is 0.184 to 0.5 Erl, while the rated traffic load is between 0.05 and 0.20 Erl. It is thus very expensive to build and operate a sufficient number of such channels.

In recent years, there has been intensified utilization of computers and automatic control, monitoring, dispatching, information and data teleprocessing systems of different classes in industry, transport, construction, trade and other fields. It is therefore essential to make multiplex channels cheaper and more effective in order to render computer systems accessible to terminals scattered over vast territories, as well as to remote and mobile terminals. There is another important aspect to this problem. Apart from being inexpensive, the data transmission channels and equipment must feature a high reliability and noise immunity in order to ensure effective real-time data transmission.

A method for an exchange of data between a central station and peripheral stations is known and is described, for example, in U.S. Pat. No. 2,226,778 of the Federal Republic of Germany, which issued Apr. 10, 1975. In the method of the German patent, an address signal is produced at the central station, which is a two-level signal with address bit values of "1" or "0," which follow one another at equal intervals.

The combination of such levels and intervals carries information on the address bits, information on the synchronization of address bit periods, and information on the synchronization of a specified number of data bit periods in the form of regular sequences.

Thus, an address signal is a periodic address sequence. The elements of this sequence are to meet a predetermined recurrence relation. The address sequence includes M non-recurrent subsequences which designate the addresses of the selected peripheral stations. There is a partial overlapping of subsequences designating the addresses of two peripheral stations next to each other.

Certain elements of the address sequence and elements intended for data transmission are then used to form elementary address signals and elementary data signals. When calling on each next-successive peripheral station, only those elementary address signals are sent into the channel which correspond to the non-overlapping part of the subsequence, designating the address of the next peripheral station. At each peripheral station, synchronizing address pulses and elements of the sequence being generated are separated from the address signal. This is followed by accumulating the separated elements of the sequence being generated and producing a subsequence of these elements, whereupon the subsequence of elements thus produced is compared with the address of the given peripheral station. An exchange of data can be effected when the accumulated subsequence of elements coincides with the address of the given peripheral substation. The address signal is modulated by at least one of the peripheral stations or by the central station. At least one data bit is used to synchronize data pulses. The information on the data pulses is contained in the equal transition intervals of the two-level address signal. There is a set number of equal transition intervals in each elementary address signal. The elementary address signals are transmitted in a certain order regardless of the presence or absence of data for each peripheral station. This means that the synchronizing address pulses and synchronizing data pulses form regular sequences. At least at one selected peripheral station, the address of which coincides with the data address, or at the central station, the address signal is demodulated by the synchronizing pulse of the given address and the synchronizing data pulse, respectively.

A system for an exchange of data between a central station and peripheral stations is also known. The known system comprises a recurrence sequence generator installed at the central station and intended to produce an address signal as a sequence whose elements are in keeping with a predetermined recurrence relation and which includes M non-recurrent subsequences designating the addresses of the selected peripheral stations. The recurrence sequence generator is connected to a first input of a code addressing unit whereof a second input serves as a data address input. A first output of the code addressing unit is an address output of the central station.

The equipment of the central station includes a data input register whose input is an information input of the central station and whose output is electrically coupled to a transmitter which is also connected to the recurrence sequence generator. The central station also incorporates a data output register whose output is an information output of the central station and whose input is electrically coupled to a receiver. An output of the transmitter and an input of the receiver are a signal output and signal input, respectively, of the central station. The central station also has a synchronizing pulse generator.

Each of the peripheral stations has a receiver electrically connected to a data output register, and a transmitter electrically connected to a data input register.

Each peripheral station includes a synchronized regular pulse generator whose input is connected to the output of the receiver, and a recurrence sequence filter connected to an address selector, a synchronizing address pulse discriminator and the receiver. The output of the data output register and the input of the data input register are an information output and an information input, respectively, of the peripheral station. The input of the receiver and the output of the transmitter are a signal input and an output, respectively, of the peripheral station.

The synchronizing input of the recurrence sequence generator is connected to an output of a regular pulse sequence generator. The recurrence sequence filter is a passive element, constructed as a shift register.

The known method includes generating two-level address signals comprising regular sequences of synchronizing address pulses and synchronizing data pulses. This means that specified periods of time are separately allotted for the reception and transmission of data to each peripheral station irrespective of the presence or absence of data for transmission from a given peripheral station to the central station and back. The stream of data is of a random nature, wherefore peripheral stations only use a small part of the periods of time allotted to them. This affects the utilization factor of the multiplex channel. The throughput of the channel is limited, and it caters to a limited number of peripheral stations. It also takes much time to transmit data. The foregoing factors account for high costs of data transmission. According to D. R. Doll, "Multiplexing and Concentration Computer Communications", ed. by P. E. Green and R. W. Lucky, Proc. of the IEEE, vol 60, No. 11, November 1972, NY, USA, typical peripheral stations use less than 10 percent of the alotted time, wherefore the channel traffic load is less than 0.1 Erl.

Furthermore, the known method is not free from errors in the addresses. This is due to the fact that the system, whereby the method is carried out, uses passive recurrence sequence filters and non-recurrent address subsequences, as well as due to the fact that the data being transmitted do not include the address of a given peripheral station.

An object of the present invention is to provide a method for an exchange of data between a central station and peripheral stations and a system for effecting same, which increases the throughput of the multiplex channel.

Another object of the invention is to provide a method for an exchange of data between a central station and peripheral stations and a system for effecting same, which permits an increase in the number of peripheral subscriber stations.

Still another object of the invention is to provide a method for an exchange of data between a central station and peripheral stations and a system for effecting same, which speeds up the real-time transmission of data through multiplex channels.

Yet another object of the invention is to provide a method for an exchange of data between a central station and peripheral stations and a system for effecting same, which reduces the costs of data transmission.

A further object of the invention is to provide a method for an exchange of data between a central station and peripheral stations and a system for effecting same, which ensures a high accuracy of data transmission.

SUMMARY OF THE INVENTION

The present invention essentially consists in providing a method for an exchange of data between a central station and peripheral stations. An address signal is produced at the central station in the form of an address sequence whose elements meet a predetermined recurrence relation and which includes M non-recurrent subsequences designating the addresses of selected peripheral stations. The subsequences, which designate the addresses of two successive peripheral stations, partially overlap. Thus, respective elements of the address sequence and elements intended for data transmission are used to form elementary address signals and elementary data signals. While calling each next-successive peripheral station, only those elementary address signals are directed into the channel, which correspond to the non-overlapping portion of the subsequence designating the selected address of the next peripheral station. Thereafter at each peripheral station synchronizing address pulses and elements of the address sequence being generated are separated from the address signals. The separated elements of the address sequence being generated are accumulated, and a subsequence of these elements is produced. This address subsequence is compared with the address of a respective peripheral station, so that the exchange of data is permitted only when and if the accumulated subsequence of elements coincides with the address of the respective peripheral station. In the method of the invention, the elementary address signals of the peripheral stations and elementary data signals, formed from respective sequence elements and respective data elements with the use of different modulation patterns or different modulation parameters, are successively transmitted. The periods of time between successive elementary address signals are set depending on the availability of data for transmission from a given peripheral station to the central station and from the central station to a given peripheral station.

In order to ensure a more effective use by the peripheral stations of time intervals between elementary address signals when an input of data to a given peripheral station occurs at random with regard to time, it is advisable that a signal indicating the presence or absence of data for transmission be successively formed at each peripheral station at a preset instant. This signal should be directed to the channel and received at the central station. This is followed by forming the elementary signal of the address of the next peripheral station. Depending upon the availability of data for transmission from a given peripheral station to the central station and back, the address signal thus formed is to be transmitted through the channel at different delays with respect to the elementary signal of the address of the selected peripheral station.

It is further expedient that, apart from the elementary address signals, the information on the address of a selected peripheral station be additionally introduced into the elementary data signals. For this purpose, appropriate coding is used to add a subsequence designating the address of a given peripheral station to the data transmitted from the given station without changing the content of that data or increasing the number of elementary data signals. At the same time, the station which receives the data, uses appropriate decoding to discriminate the data and the subsequence designating the address of the given peripheral station. This subsequence is then compared to the actual address of the given peripheral station.

In order to increase the accuracy of addressing with regard to peripheral stations, while successively transmitting elementary address and data signals, it is expedient that the number of the received elements of sequences designating the addresses of the peripheral stations be greater than the minimum number N of elements of non-recurrent subsequences. At the same time, the number of elements in the non-overlapping part of the subsequence transmitted to the channel must be equal to or greater than unity.

In order to increase the accuracy of addressing with regard to peripheral stations, while successively transmitting elementary address and data signals, it is further expedient that each peripheral station generate an address signal similar to the address signal of the central station. This signal must be a sequence whose elements are in a predetermined recurrence relation. The address signal of the peripheral station is to be multiplied by the separated address signal of the central station. The address signal of the peripheral station is made cophasal with error signals produced by multiplication. The accumulated subsequence of elements of the cophasal address signal of this peripheral station is compared with the address of a respective peripheral station.

While successively transmitting elementary address and data signals, it is advisable that synchronizing data pulses should be discriminated from the data signal.

While successively transmitting elementary address and data signals, it is advisable that at each peripheral station there be produced enabled synchronizing address pulse and synchronizing data pulse sequences which correspond to the address signal and data signal formats. The discriminated synchronizing address pulses and synchronizing data pulses are compared with the enabled synchronizing address pulse and synchronizing data pulse sequences.

The system of the present invention carries out the aforedescribed method. In the system of the invention, the central station, incorporates a recurrence sequence generator for producing an address signal which is a sequence whose elements meet a predetermined recurrence relation and which includes M non-recurrent subsequences designating the addresses of selected peripheral stations. The recurrence sequence generator is connected to a first input of a code addressing unit for comparing the actual values of the recurrence sequence produced by the generator with the address of a given peripheral station and enabling a reception of data from and/or transmission of data to a given peripheral station if the accumulated subsequence coincides with the address of this peripheral station. A second input of the code addressing unit is a data address input. A first output of the code addressing unit is an address output of the central station. The central station includes a data input register whose input serves as an information input of the central station and whose output is electrically connected to a transmitter which is also connected to the recurrence sequence generator. The central station further includes a data output register whose output serves as an information output of the central station and whose input is electrically connected to a receiver. The central station includes a regular synchronizing pulse generator intended to produce a regular set of clock frequencies. An output of the transmitter and an input of the receiver are a signal output and a signal input, respectively, of the central station. Each peripheral station of the system according to the invention has a receiver electrically connected to the data output register, a transmitter electrically connected to the data input register, a synchronized regular pulse generator having its input connected to an output of the receiver, and a recurrence sequence filter connected to an address selector, to a synchronizing address pulse discriminator, and to the receiver. The output of the data output register and the input of the data input register serve as an information output and an information input, respectively, of a peripheral station. The input of the receiver and the output of the transmitter serve as a signal input and a signal output of a peripheral station. In the system of the invention, the central station includes a pulse former for forming an irregular sequence of synchronizing pulses, for determining irregular time intervals between successive elementary address signals, dependent on random data streams, as well as for producing a sequence, corresponding to these time intervals, of successive synchronizing address pulses and synchronizing data pulses. A first input of the pulse former is connected to the output of the code addressing unit and a second input thereof is connected to the regular synchronizing pulse generator. A synchronizing data pulse output of the pulse former is connected to the inputs of the data input register and a coder, respectively. The output of the coder is connected to the transmitter and its second input is connected to the data input register. A synchronizing received data pulse output of the pulse former is connected to the inputs of the data output register and a decoder connected to the receiver and the data output register. A synchronizing address pulse output of the pulse former is connected to the input of the recurrence sequence generator. Each peripheral station also has a controlled pulse former for forming an irregular sequence of synchronizing pulses. A first input of the controlled pulse former is connected to the output of the synchronized regular pulse generator and a second input thereof is connected to an enable output of the address selector. The synchronizing received data pulse output of the controlled pulse former is connected to the input of the data output register and to the input of the decoder connected to the receiver and the data output register. The synchronizing transmitted data pulse output of the controlled pulse former is connected to the input of the data input register and to the input of the coder connected to the transmitter and to the data input register. Inputs of the synchronizing address pulse discriminator are connected to the receiver and to the synchronized regular pulse generator.

It is expedient that the pulse former contain a first pulse distributor for producing synchronizing address pulses. A first setting unit for determining the initial data transmission conditions has a first input connected to the first pulse distributor, a second input connected to the code addressing unit, and one of its outputs connected to an input of the first pulse distributor. The first pulse distributor has synchronizing pulse outputs connected to the input of the recurrence sequence generator. A second pulse distributor produces synchronizing data pulses. A second setting unit for determining the conditions for repeating and ending the transmission of data has first input connected to an output of the second pulse distributor, a second input connected to the decoder, a first output connected to the input of the first pulse distributor, a second output connected to the input of the code addressing unit, and a third output connected to the input of the second pulse distributor. The second pulse distributor has synchronizing data pulse outputs connected to the inputs of the data input register and the coder, as well as to the data output register and the decoder. The pulse distributors have synchronizing inputs connected to the regular synchronizing pulse generator. It is also expedient that at each of the peripheral stations, the controlled pulse former include a first distributor for producing synchronizing address pulses and connected to a first controlled setting unit. The first controlled setting unit has a first output connected to an input of a first distributor and a second output connected to an input of a second distributor connected to a second controlled setting unit. The second controlled setting unit has a first output connected to the input of the second distributor and a second output connected to the input of the first distributor. The distributors have synchronizing inputs connected to the output of the synchronizing regular pulse generator, set inputs connected to the output of the synchronizing address pulse discriminator and outputs connected to first inputs of switching circuits. The switching circuits have second inputs connected to the output of the address selector and outputs connected to inputs of the decoder, data output register, coder, and data input register.

The recurrence sequence filter is preferably an active recurrence sequence filter.

It is desirable that the active recurrence sequence filter include a recurrence sequence generator constructed as a shift register with modulo two adders in its feedback loops. The shift register has parallel outputs connected to the address selector and a feedback loop connected to an automatic phasing circuit and to a correlation analyzer. The automatic phasing circuit has an output connected to the input of the recurrence sequence generator. Other inputs of the automatic phasing circuit and the correlation analyzer are connected to the output of the receiver. The automatic phasing circuit has a control input connected to an output of the correlation analyzer. The correlation analyzer has an enable output connected to the input of the address selector. The synchronizing inputs of the recurrence sequence generator and the correlation analyzer are connected to the synchronizing address pulse discriminator.

It is advisable that the coder of the central station and each peripheral station include switching circuits having control inputs connected to the output of the recurrence sequence generator at the central station and to the output of the recurrence sequence filter at each peripheral station. The switching circuits have synchronizing inputs connected to the output of the pulse former at the central station and to the output of the controlled pulse former at each peripheral station. Each of the switching circuits has an output connected to respective set inputs of the coder. The decoders of each peripheral station and of the central station include switching circuits having control inputs connected to the output of the recurrence sequence generator at the central station and to the output of the recurrence sequence filter at each peripheral station. The switching circuits have synchronizing inputs connected to the output of the pulse former at the central station and to the output of the controlled pulse former at each peripheral station. Each of the switching circuits has an output connected to a respective set input of the decoder.

The coders of the central station and of each peripheral station preferably include switching circuits having control inputs connected to the output of the recurrence sequence generator at the central station and to the output of the recurrence sequence filter at each peripheral station. The switching circuits have synchronizing inputs connected to the output of the pulse former at the central station and to the output of the controlled pulse former at each peripheral station. Each of the switching circuits has an output connected to a respective set input of the coder. The decoders of each peripheral station and of the central station include coincidence gates, each having first inputs connected to respective outputs of the decoder, second inputs connected to the output of the recurrence sequence generator at the central station and to the output of the recurrence sequence filter at each of the peripheral stations and outputs connected to the decoding means of the decoder.

The coders of the central station and that of each peripheral station preferably also include an address coder in series with a modulo two adder. The modulo two adder has a connected to a respective output of the coder. The address coder has an input connected to the output of the recurrence sequence generator at the central station and to the output of the recurrence sequence filter at each of the peripheral stations. The modulo two adder has an output which is the output of the coder. The decoders of each peripheral station and of the central station include an address coder connected in series with a modulo two adder. The modulo two adder has a second input connected to the output of the receiver and an output connected to the inputs of the data output register and the decoder.

The combination of the coder at the central station and the decoders at the peripheral stations, as well as the combination of the coders at the peripheral stations and the decoder at the central station transmit directions from the central station to the peripheral stations and from the peripheral stations to the central station.

Each peripheral station preferably includes a synchronizing address pulse checking circuit including a counter having one output connected to a first input of an interlocking circuit. The interlocking circuit has a second input connected to the output of the controlled pulse former and an output connected to an input of the counter. The counter has a second output connected to the input of the address selector. The synchronizing address pulse checking circuit also includes a coincidence check unit having inputs connected to the outputs of the controlled pulse former pulses and to the synchronizing address pulse discriminator and an output connected to set inputs of the counter.

Each peripheral station preferably includes a data availability signal former interposed between an additional output of the data input register and the input of the transmitter. The data availability former has a synchronizing input connected to the output of the controlled pulse former. The central station preferably also includes a data availability signal discriminator interposed between the output of the receiver and the input of the pulse former. The data availability signal discriminator has a synchronizing input connected to the output of the pulse former.

The present invention permits a considerable increase in the utilization factor of multiplex channels intended to provide access to computer and data transmission networks to subscribers scattered over vast territories and/or mobile subscribers. An increased utilization factor of such channels manifests itself in an improved throughput of channels at random loads and in the course of real-time operation, as well as in an increased number of subscribers and speedier and less expensive data transmission. The system of the invention is 2 to 10 times more effective than conventional systems.

BRIEF DESCRIPTION OF THE DRAWINGS

Other objects and advantages of the present invention will become more apparent from the following detailed description of a preferred embodiment thereof, taken in conjunction with the accompanying drawings, wherein:

FIG. 13 is a circuit diagram of an embodiment of the data availability signal discriminator of the invention;

FIG. 14 is a key circuit diagram of an embodiment of the recurrence sequence generator of the invention;

FIGS. 18a, 18b, 18c, 18e, 18g, 18h, 18k and 18q are time plots illustrating an exchange of data between the central station and peripheral stations of the system of the invention.

DESCRIPTION OF PREFERRED EMBODIMENTS

Figure 1:
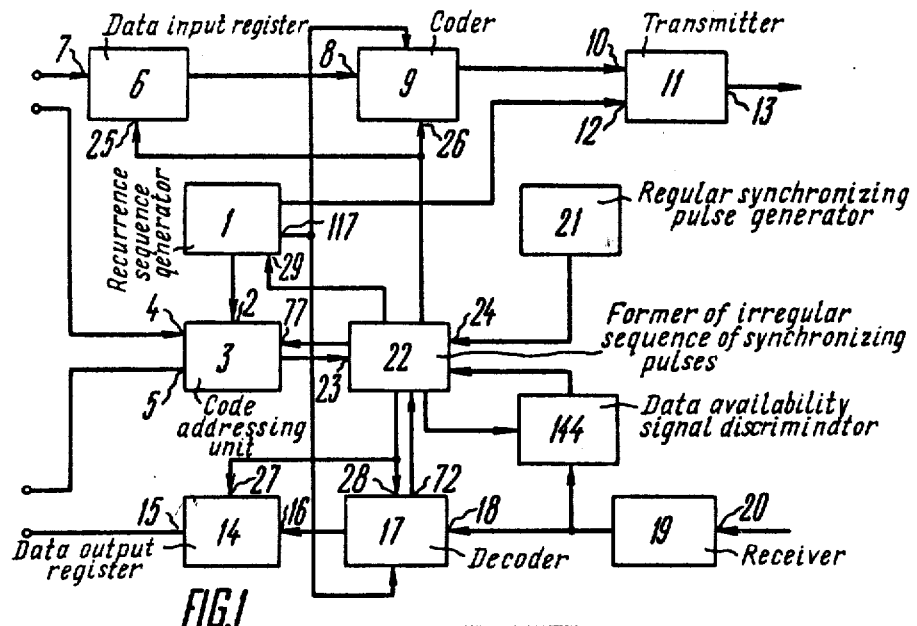
FIG. 1 is a block diagram of an embodiment of the central station of the system of the invention for transmission of data between a central station and peripheral stations.

The system of the invention for an exchange of data between a central station and peripheral stations comprises a central station which includes a recurrence sequence generator 1 (FIG. 1) for producing an address signal as a sequence whose elements are in a predetermined recurrence relation and which includes M nonrecurrent subsequences designating the addresses of selected peripheral stations. The generator 1 is connected to an input 2 of a code addressing unit 3 for comparing the accumulated subsequences with the address of a selected peripheral station and enabling a reception of data from a given peripheral station or transmission of data to a given peripheral station if the accumulated subsequence coincides with the address of the peripheral station. An input 4 of the unit 3 is a data address input and an output 5 of said unit is an address output of the central station.

The central station includes a data input register 6 having an input 7 which is an information input of the central station and an output connected to an input 8 of a coder 9 having an output connected to an input 10 of a transmitter 11. An input 12 of the transmitter 11 is connected to the output of the generator 1 and an output 13 of said transmitter is a signal output of the central station.

The central station has a data output register 14 having an output 15 which is an information output of the central station. An input 16 of the register 14 is connected to an output of a decoder 17. An input 18 of the decoder 17 is connected to an output of a receiver 19 having an input 20 which is a signal input of the central station.

Apart from the foregoing units, the central station includes a regular synchronizing pulse generator 21 for producing a preselected regular set of clock frequencies and a pulse former 22 for forming an irregular sequence of synchronizing pulses, for determining irregular time intervals between successive elementary address signals, which are dependent on random data streams, and for producing a sequence, corresponding to these time intervals, of successive synchronizing address pulses and synchronizing data pulses. An input 23 of the pulse former 22 is connected to the output of the code addressing unit 3. An input 24 of the pulse former 22 is connected to an output of the generator 21. A synchronizing pulse output for data being transmitted of the pulse former 22 is connected to an input 25 of the data input register 6 and to an input 26 of the coder 9. A synchronizing pulse output for data being received of the pulse former 22 is connected to an input 27 of the data output register 14 and to an input 28 of the decoder 17. A syncrhonizing address pulse output of the pulse former 22 is connected to an input 29 of the recurrence sequence generator 1.

Each peripheral station of the system of the invention comprises a receiver 30 (FIG. 2) whose input 31 is a signal input of the peripheral station. The receiver has an output connected to an input 32 of a decoder 33 having an output connected to an input 34 of a data output register 35. An output 36 of the register 35 is an information output of the peripheral station.

Each peripheral station also includes a transmitter 37 having an output 38 which is a signal output of the peripheral station, and an input 39 connected to an output of a coder 40. An input 41 of the coder 40 is connected to an output of a data input register 42. An input 43 of the register 42 is an information input of the peripheral station.

In addition to the foregoing units, each peripheral station includes a synchronized regular pulse generator 44 having an input 45 connected to the output of the receiver 30. Each peripheral station also has a recurrence sequence filter 46 having outputs connected to respective inputs of an address selector 47. An input 48 of the filter 46 is connected to an output of a synchronizing address pulse discriminator 49. An input 50 of the filter 46 is connected to the output of the receiver 30.

Each peripheral station includes a controlled pulse former 51 for forming an irregular sequence of synchronizing pulses. The controlled pulse former 51 has an input 52 connected to the output of the synchronized regular pulse generator 44 and an input 53 connected to an enable output of the address selector 47. A synchronizing pulse output for data being received of the controlled pulse former 51 is connected to an input 54 of the decoder 33 and to an input 55 of the data output register 35. A synchronizing pulse output for data being transmitted of the controlled pulse former 51 is connected to an input 56 of the coder 40 and to an input 57 of the data input register 42.

An input 58 of the discriminator 49 is combined with the input 52 of the controlled pulse former 51 and connected to the output of the synchronized regular pulse generator 44. An input 59 of the discriminator 49 is connected to the output of the receiver 30.

The pulse former 22 comprises a pulse distributor 60 (FIG. 3) for producing synchronizing address pulses and composed of flip-flops $60_1, \ldots, 60_s$ connected in series.

The pulse former 22 includes a setting unit 61 for determining the initial data transmission conditions and comprising AND gates 62 and 63 and an OR gate 64. A first input of the OR gate 64 is connected to the output of the code addressing unit 3 (FIG. 1). The output of the OR gate 64 is connected to a first input of the AND gate 63 (FIG. 3) whose second input is combined with a first input of the AND gate 62 and connected to the output of the flip-flop $60_s$ of the pulse distributor 60. A second input of the AND gate 62 is connected to the output of the AND gate 63. The output of the AND gate 62 is connected to an input 65 of an OR gate 66. Synchronizing pulse outputs of the pulse distributor 60 are connected to the input 29 of the recurrence sequence generator 1 (FIG. 1).

The pulse former 22 includes a pulse distributor 67 (FIG. 3) for producing synchronizing data pulses and composed of flip-flops $68_1, \ldots, 68_m$ connected in series.

The pulse former 22 also includes a setting unit 69 for determining the conditions for repeating and ending the transmission of data and composed of AND gates 70 and 71. A first input of the AND gate 71 is connected to an output 72 (FIG. 1) of the decoder 17. A second input of the AND gate 71 is combined with a first input of the AND gate 70 (FIG. 3) and connected to the output of the flip-flop $68_m$. A second input of the AND gate 70 is connected to the output of the AND gate 71, which is connected to an input 73 of an OR gate 74. An input 75 of the OR gate 74 is connected to the output of the AND gate 63. The output of the AND gate 70 is connected to an input 76 of the OR gate 66 and to an input 77 (FIG. 1) of the code addressing unit 3. The output of the OR gate 66 is connected to one of the inputs of the flip-flop $60_1$ of the pulse distributor 60.

Synchronizing data pulse outputs of the distributor 67 (FIG. 3) are connected to the inputs 25 and 26 (FIG. 1) of the data input register 6 and the coder 9, respectively, and are also connected, via a delay circuit 78 (FIG. 3), to the inputs 27 and 28 (FIG. 1) of the data output register 14 and decoder 17, respectively. Synchronizing inputs of the distributors 60 and 67, which are the input 24 (FIG. 1) of the pulse former 22, are connected to the output of the regular synchronizing pulse generator 21.

At each of the peripheral stations, the controlled pulse former 51 (FIG. 2) comprises a distributor 79 (FIG. 4) for producing synchronizing address pulses and composed of flip-flops $80_1, \ldots, 80_s$ connected in series.

The controlled pulse former 51 includes a controlled setting unit 81 having AND gates 82 and 83.

A first input of the AND gate 82 is combined with a first input of the AND gate 83 and connected to the output of the flip-flop $80_s$. A second input of the AND gate 83 is connected to an output 84 (FIG. 2) of the discriminator 49. The output of the AND gate 82 (FIG. 4) is connected to an input 85 of an OR gate 86 whose output is connected to a first input of the flip-flop $80_1$.

The controlled pulse former 51 also has a distributor 87 which comprises flip-flops $88_1, \ldots, 88_m$, and a controlled setting unit 89 which comprises AND gates 90 and 91. A first input of the AND gate 91 is connected to the output 84 (FIG. 2) of the discriminator 49. A second input of the AND gate 91 is combined with a first input of the AND gate 90 and is connected to the output of the flip-flop $88_m$. A second input of the AND gate 90 is connected to the output of the AND gate 91, which is connected to an input 92 of an OR gate 93. The OR gate 93 has an input 94 connected to the output of the AND gate 83 connected to the second input of the AND gate 82. The output of the AND gate 90 is connected to an input 95 of the OR gate 86.

Synchronizing inputs of the distributors 79 and 87, which are the input 52 (FIG. 2) of the controlled pulse former 51, are connected to the output of the synchronized regular pulse generator 44. Set inputs of the distributors 79 and 87 (FIG. 4) are connected to the output 84 of the synchronizing address pulse discriminator 49. Outputs of the discriminator 79 (FIG. 4) are connected to first inputs of switching circuits $96_1, \ldots, 96_s$. Outputs of the distributor 87 are connected to first inputs of switching circuits $97_1, \ldots, 97_m$. Outputs of the switching circuits $97_1, \ldots, 97_m$ are connected to the inputs 54 (FIG. 2) and 55 of the decoder 33 and the data output register 34, respectively, and are also connected, via delay circuits 98 (FIG. 4), to the inputs 56 and 57 (FIG. 2) of the coder 40 and data input register 42, respectively. Second inputs of all the switching circuits $96_1, \ldots, 96_s$ (FIG. 4) and $97_1, \ldots, 97_m$, which constitute the input 53 (FIG. 2) of the controlled pulse former 51, are connected to the output of the address selector 47.

Figure 2:
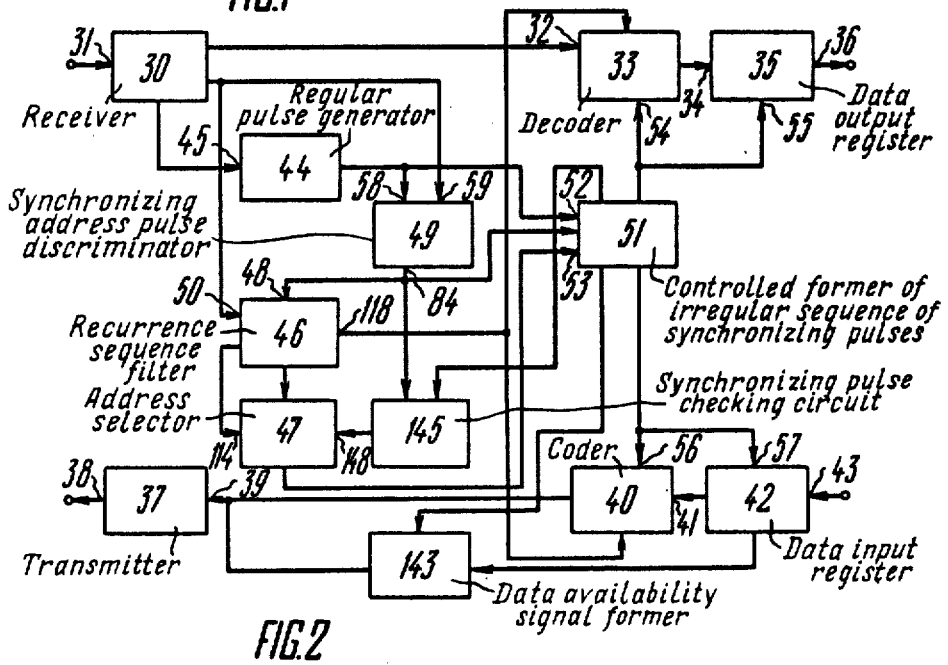
FIG. 2 is a block diagram of an embodiment of a peripheral station of the system of the invention for transmission of data between a central station and peripheral stations.
Figure 5:
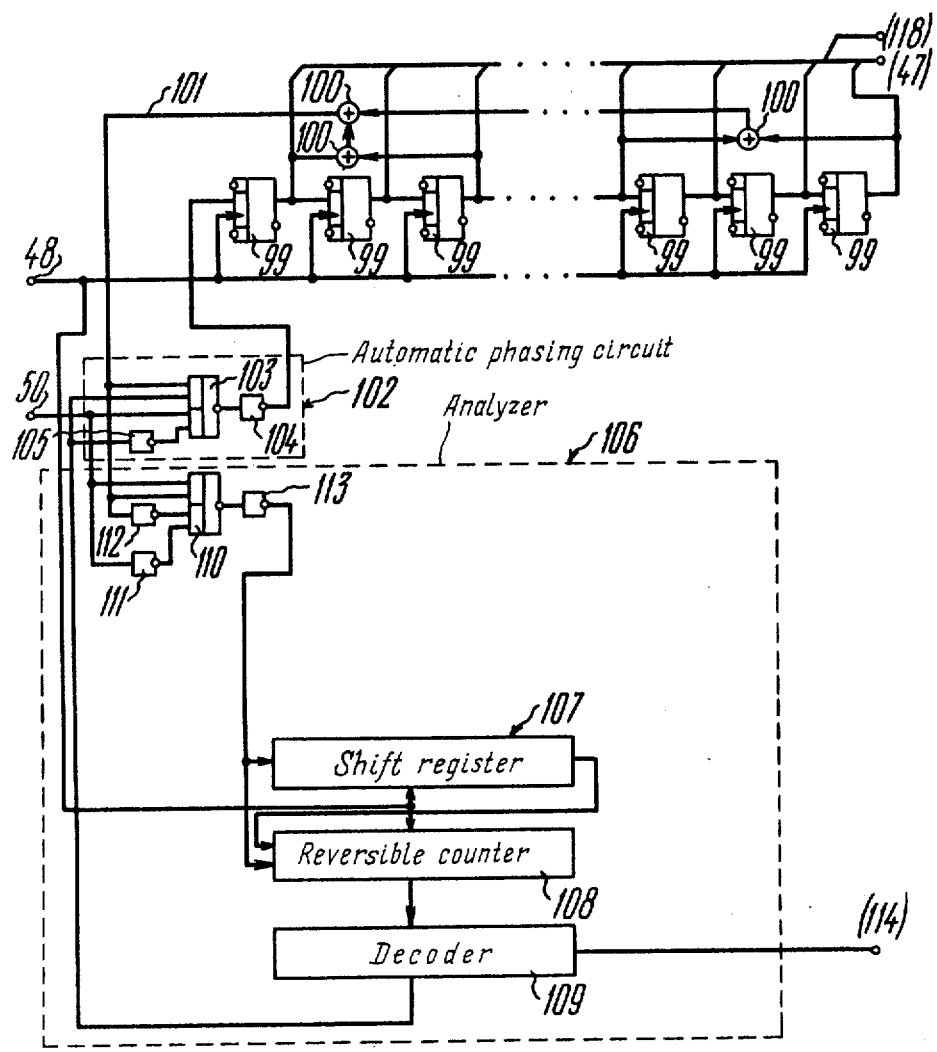
FIG. 5 is a functional circuit diagram of an embodiment of the recurrence sequence filter of the invention.

The recurrence sequence filter 46 (FIG. 2) comprises a recurrence sequence generator which is a shift register composed of flip-flops 99 (FIG. 5) with modulo two adders 100 in their feedback loops. The filter 46 has parallel outputs connected to the inputs of the address selector 47 (FIG. 2).

A feedback loop 101 (FIG. 5) is connected to a first input of an automatic phasing circuit 102, which comprises an AND-to-AND-to-OR gate 103 and AND gates 104 and 105, and to a first input of a correlation analyzer 106.

The analyzer 106 comprises a shift register 107, a reversible counter 108, a decoder 109, an AND-to-AND-to-OR gate 110 and NOT gates 111, 112 and 113.

The output of the circuit 102 is connected to the input of the shift register. Other inputs of the circuit 102 and the analyzer 106, which constitute the input 50 (FIG. 2) of the filter 46, are connected to the output of the receiver 30.

An enable output of the decoder 109 (FIG. 5) is connected to an input 114 (FIG. 2) of the address selector 47. A control output of the decoder 109 (FIG. 5) is connected to a control input of the automatic phasing circuit 102.

Synchronizing inputs of the recurrence sequence generator and the correlation analyzer 106, which constitute the input 48 of the filter 46, are connected to the output 84 (FIG. 2) of the discriminator 49.

Figure 6:
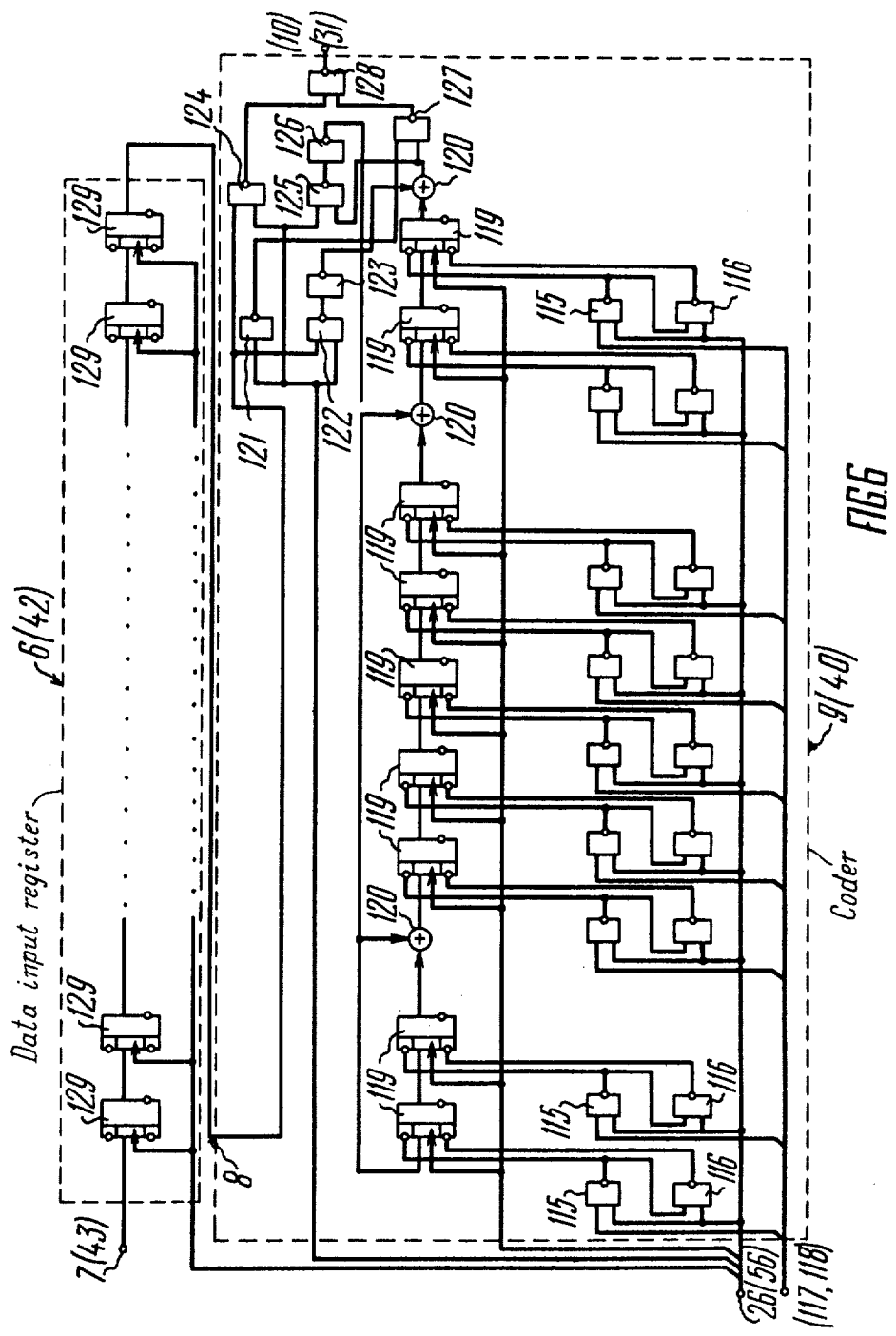
FIG. 6 is a functional circuit diagram of embodiments of the coder and data input register of the invention.

FIG. 6 is a functional circuit diagram of the coder 9 (FIG. 1) and data input register 6. The coder 40 (FIG. 2) and data input register 42 are identical to the coder 9 and data input register 6, respectively.

The coder 9 comprises a coding means and switching circuits incorporating AND gates 115 (FIG. 6) and 116 whose control inputs are connected to an output 117 (FIG. 1) of the recurrence sequence generator 1.

Control inputs of the AND gates 115 (FIG. 6) and 116 of the coder 40 (FIG. 2) are connected to an output 118 of the filter 46.

Synchronizing inputs of the AND gates 115 (FIG. 6) and 116, which constitute the input 26 of the coder 9, are connected to the output of the pulse former 22 (FIG. 1).

Synchronizing inputs of the AND gates 115 and 116 (FIG. 6), which constitute the input 65 (FIG. 2) of the coder 40, are connected to the output of the controlled pulse former 51.

Each of the AND gates 115 and 116 (FIG. 6) has its output connected to a respective set input of a coder built around flip-flops 119 with modulo two adders 120 in their feedback loops, which also contains a control circuit incorporating a NOT gate 121, an AND gate 122, a NOT gate 123, AND gates 124 and 125, a NOT 126, an AND gate 127 and an OR gate 128.

The output of the OR gate 128 is connected to the input 10 (FIG. 1) of the transmitter 11 of the central station and to the input 39 (FIG. 2) of the transmitter 37 at each peripheral station.

FIG. 6 also shows the data input register 6 (FIG. 1) built around flip-flops 129 (FIG. 6). The data input register 42 (FIG. 2) is similar to the data input register 6. The central station has a plurality of data input registers 6.

The decoders 33 and 17 (FIG. 1) are similar to each other. Each of the decoders 33 and 17 comprise switching circuits built around AND gates 130 (FIG. 7) and 131 whose control inputs are connected to the output 117 (FIG. 1) of the recurrence sequence generator 1 at the central station.

Control inputs of the AND gates 130 and 131 (FIG. 7) of the decoder 33 (FIG. 2) are connected to the output 118 of the filter 46.

Synchronizing inputs of the AND gates 130 and 131 (FIG. 7), which constitute the input 28 (FIG. 1) of the decoder 17, are connected to the output of the pulse former 22.

Synchronizing inputs of the AND gates 130 and 131 (FIG. 7) which constitute the input 54 (FIG. 2) of the decoder 33, are connected to the output of the controlled pulse former 51.

The output of each of the AND gates 130 and 131 (FIG. 7) is connected to respective set inputs of a decoder built around flip-flops 132 with modulo two adders 133 in their feedback loops. The outputs of all the flip-flops 132 are connected to inputs of a decoder 134 whose output is connected to the input of the pulse former 22 (FIG. 1).

Figure 7:
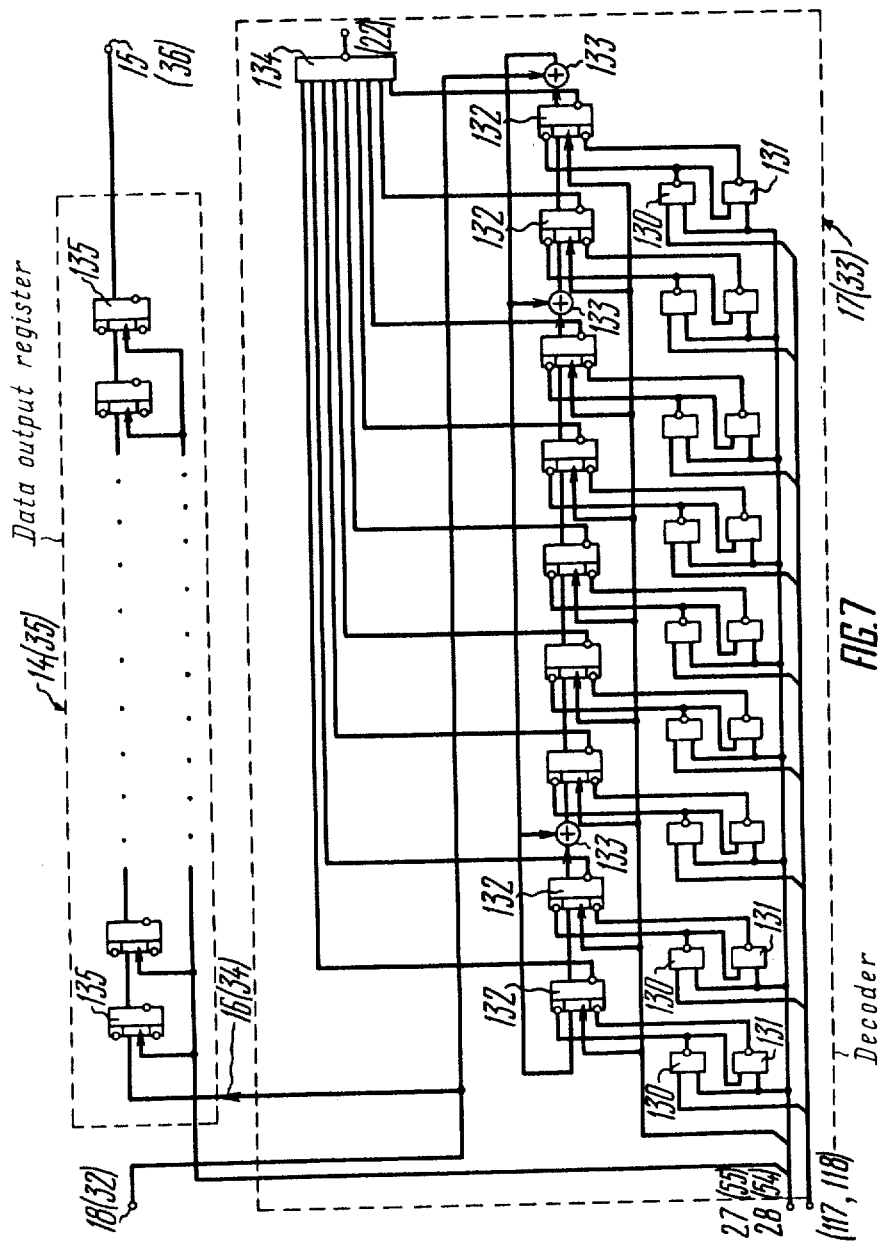
FIG. 7 is a functional circuit diagram of embodiments of the decoder and data output register of the invention.

FIG. 7 also shows the data input register 14 comprising flip-flops 135. The data output register 35 (FIG. 2) is similar to the register 14.

Figure 8:
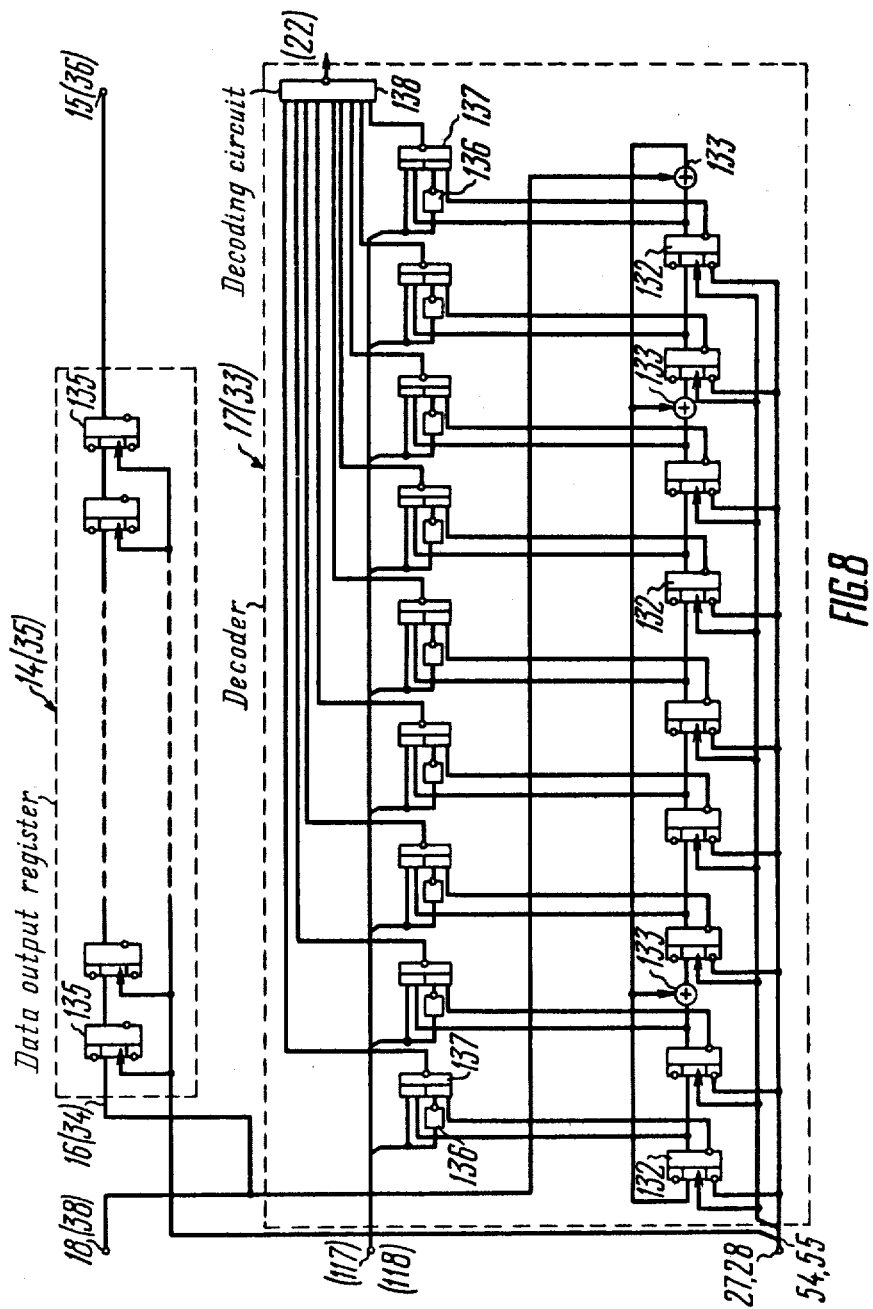
FIG. 8 is a functional circuit diagram of other embodiments of the decoder and data output register of the invention.

FIG. 8 shows an alternative embodiment of the decoder 17 (FIG. 1). The decoder 33 (FIG. 2) is similar to the decoder 17. The decoder 17 (FIG. 1) includes coincidence gates, each comprising, in turn, NOT gates 136 and an AND-to-AND-to-OR gate 137. First inputs of the coincidence gates are connected to respective outputs of the decoder built around the flip-flops 132 with the adders 133 in their feedback loops. Second inputs of the coincidence gates are connected to the output 117 (FIG. 1) of the recurrence sequence generator. The outputs of the coincidence gates are connected to a decoding circuit 138 (FIG. 8) whose output is connected to the pulse former 22 (FIG. 1).

Figure 9:
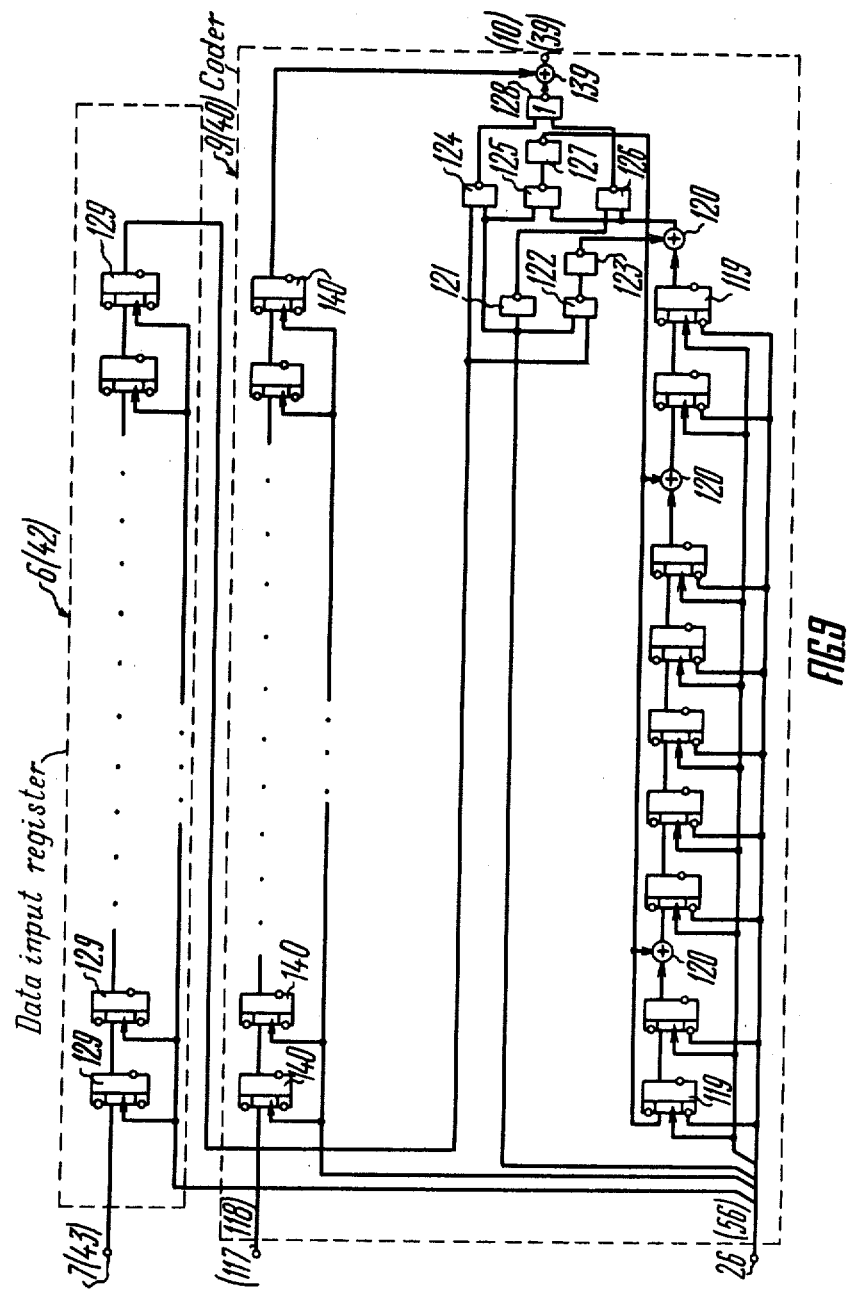
FIG. 9 is a functional circuit diagram of other embodiments of the coder and data input register of the invention.
Figure 10:
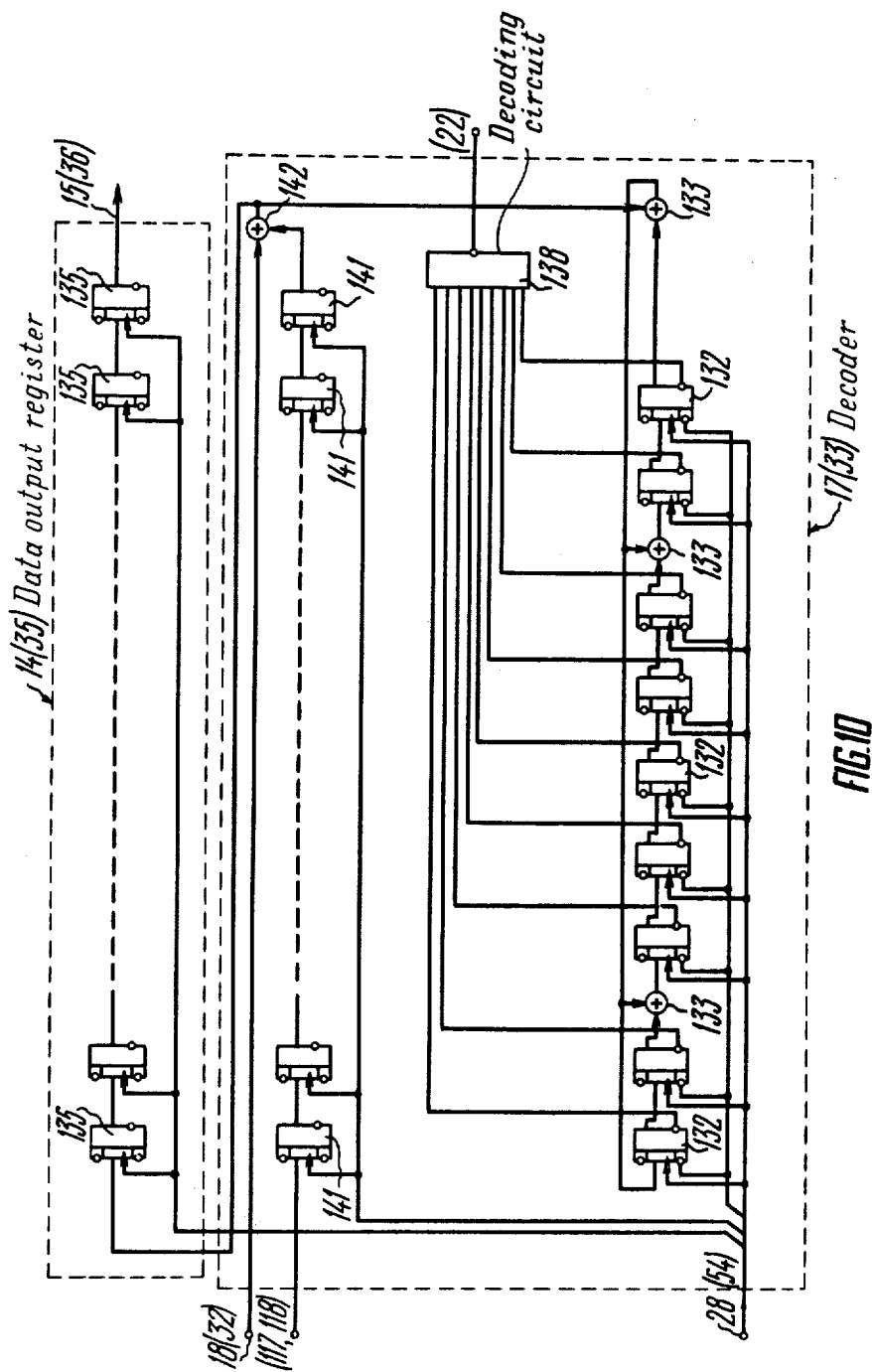
FIG. 10 is a functional circuit diagram of still other embodiments of the decoder and data output register of the invention.

FIG. 9 shows an alternative embodiment of the coder 9. The coder 40 (FIG. 2) is similar to the coder 9. The coder 9 comprises coding means built around the flip-flops 119 with the adders 120 in their feedback loops, and a control circuit build around the AND gates 121 and 122, the NOT gate 123, the AND gates 124, 125 and 126, the NOT gate 127 and the OR gate 128. The coder 9 further comprises an address coder means and a modulo two adder 139 connected in series. A first input of the adder 139 is connected to the output of the OR gate 128. The output of the adder 139 is connected to the input 10 (FIG. 1) of the transmitter 11. The address coder means is built around flip-flops 140 and connected to the output 117 (FIG. 1) of the generator 1. The output of the address coder means is connected to a second input of the adder 139. FIG. 10 shows another alternative embodiment of the decoder 17. The decoder 33 (FIG. 2) is similar to the decoder 17. The decoder 17 (FIG. 10) includes, in series connection, an address coder means built around flip-flops 141 and a modulo two adder 142. A first input of the adder 142 is connected to the output of the receiver 19. The output of the adder 142 is connected to the input 16 of the data output register 14 and to the input of the decoder.

Each peripheral station includes a data availability signal former 143 interposed between an additional output of the data input register 42 (FIG. 2) and the transmitter 37. A synchronizing input of the pulse former 143 is connected to the outputs of the switching circuits 96₁, ..., 96₅ (FIG. 4) of the controlled pulse former 51, the connection being effected via a delay circuit 143'.

Figure 3:
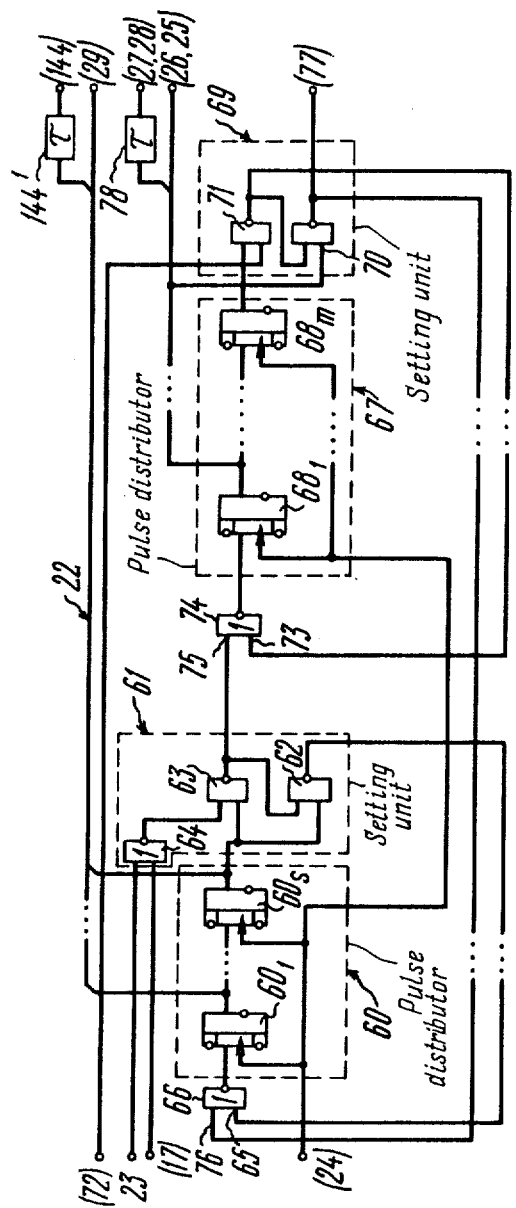
FIG. 3 is a functional circuit diagram of an embodiment of the pulse former of the invention for forming an irregular sequence of synchronizing pulses.

The central station includes a data availability signal discriminator 144 interposed between the output of the receiver 19 (FIG. 1) and the input of the pulse former 22. A synchronizing input of the discriminator 144 is connected to the synchronizing pulse outputs of the distributor 60 (FIG. 3), the connection being effected via a delay circuit 144'. The discriminator 144 (FIG. 1) has its output connected to the second input of the OR gate 64 (FIG. 3).

Figure 11:
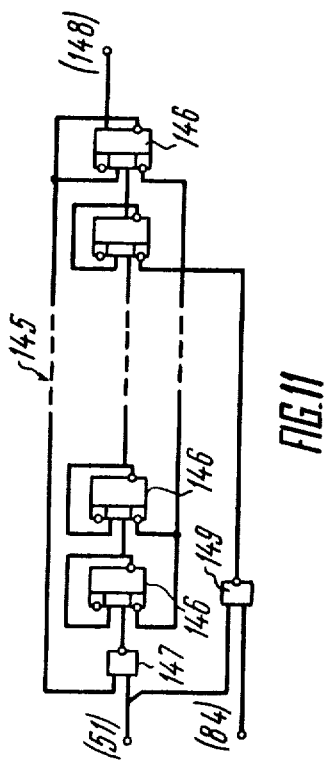
FIG. 11 is a circuit diagram of an embodiment of the synchronizing address pulse checking circuit of the invention.

Each peripheral station includes a synchronizing address pulse checking circuit 145 (FIG. 2) comprising a counter built around flip-flops 146 (FIG. 11). A first output of the counter is connected to a first input of an interlocking circuit 147. The interlocking circuit 147 has a second input connected to the outputs of the distributors 79 (FIG. 4) and 87 of the controlled pulse former 51. The interlocking circuit 147 has an output connected to the input of the counter. The second output of the counter is connected to an input 148 (FIG. 2) of the address selector 47.

The circuit 145 (FIG. 11) further includes a coincidence check unit 149 whose inputs are connected to respective outputs of the controlled pulse former 51

(FIG. 2) and the output 84 of the discriminator 49. The coincidence check unit 149 (FIG. 11) has its output connected to the set inputs of the counter.

Figure 12:
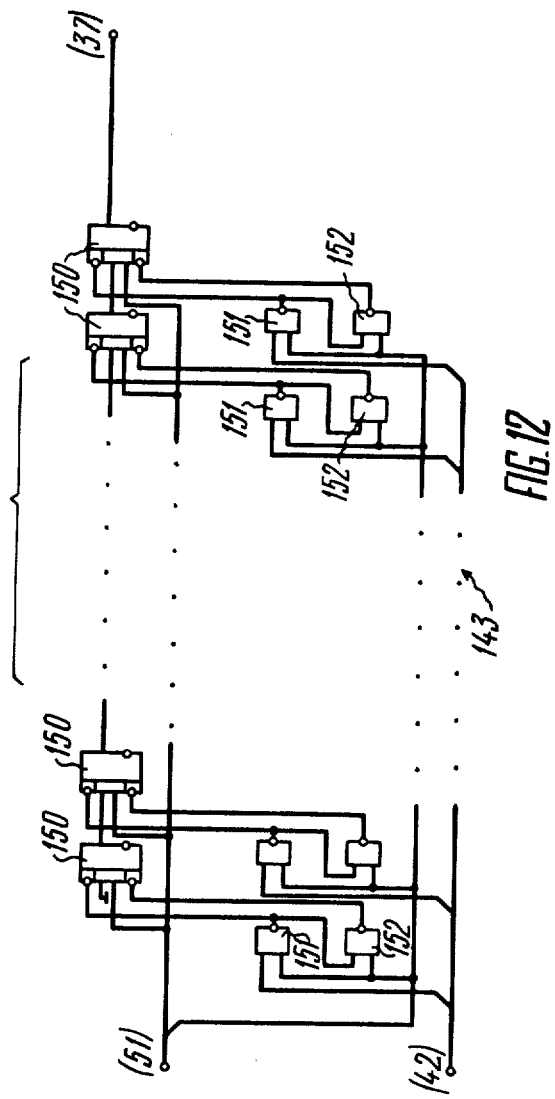
FIG. 12 is a key circuit diagram of an embodiment of the data availability signal former of the invention.

The data availability signal former 143 (FIG. 2) comprises a shift register built around flip-flops 150 (FIG. 12) and switching circuits built around AND gates 151 and 152.

The data availability signal discriminator 144 (FIG. 1) comprises a shift register built around flip-flops 153 (FIG. 13) and a decoder 154.

FIG. 14 shows the recurrence sequence generator 1 (FIG. 1). The recurrence sequence generator 1 comprises a shift register built around flip-flops 155 (FIG. 14) with adders 156 in their feedback loops.

Figure 15:
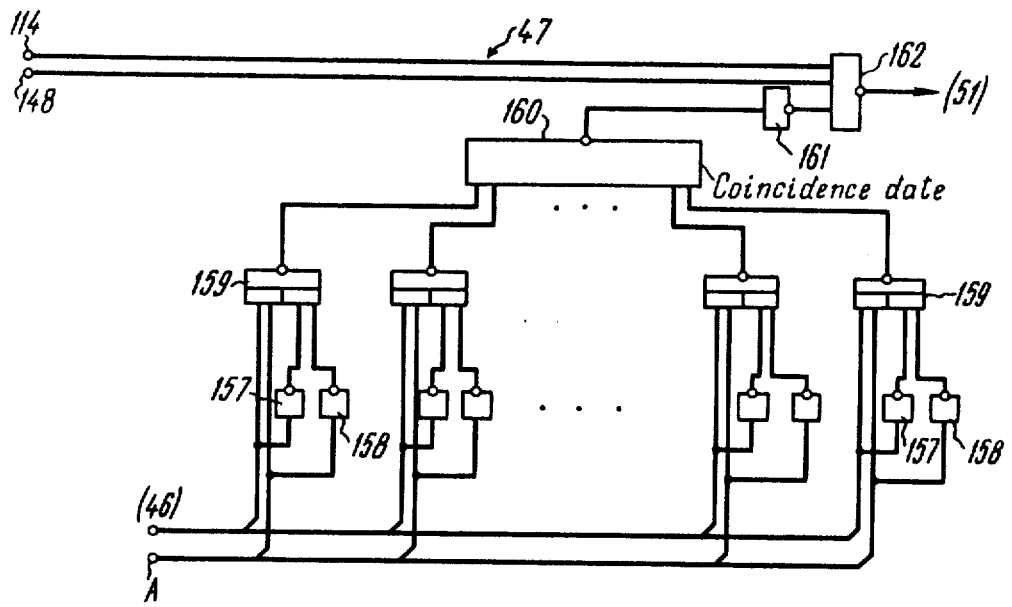
FIG. 15 is a key circuit diagram of an embodiment of the address selector of the invention.

FIG. 15 shows the address selector 47 (FIG. 2). The address selector 47 comprises coincidence gates, each corresponding to a respective bit and composed of NOT gates 157 (FIG. 15) and 158 and an AND-to-AND-to-OR gate 159. The address selector 47 further comprises a multi-input coincidence gate 160 and a coincidence gate composed of a NOT gate 161 and an AND gate 162.

An address assignment input A of each peripheral station is connected to an address switching circuit (not shown). The input A is also connected to the coincidence gates.

Figure 16:
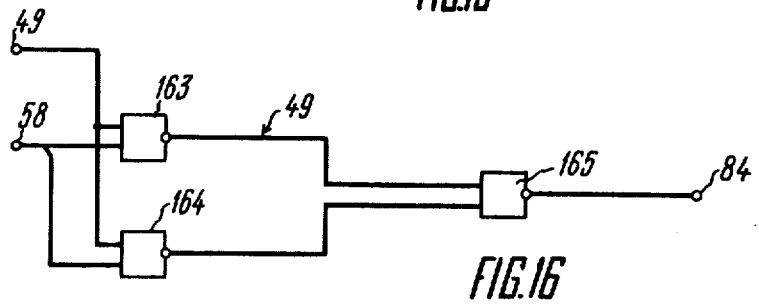
FIG. 16 is a key circuit diagram of an embodiment of the synchronizing address pulse discriminator of the invention.

FIG. 16 shows the synchronizing address pulse discriminator 49 (FIG. 2). The discriminator 49 comprises AND gates 163, 164 and 165 which are appropriately interconnected.

Figure 17:
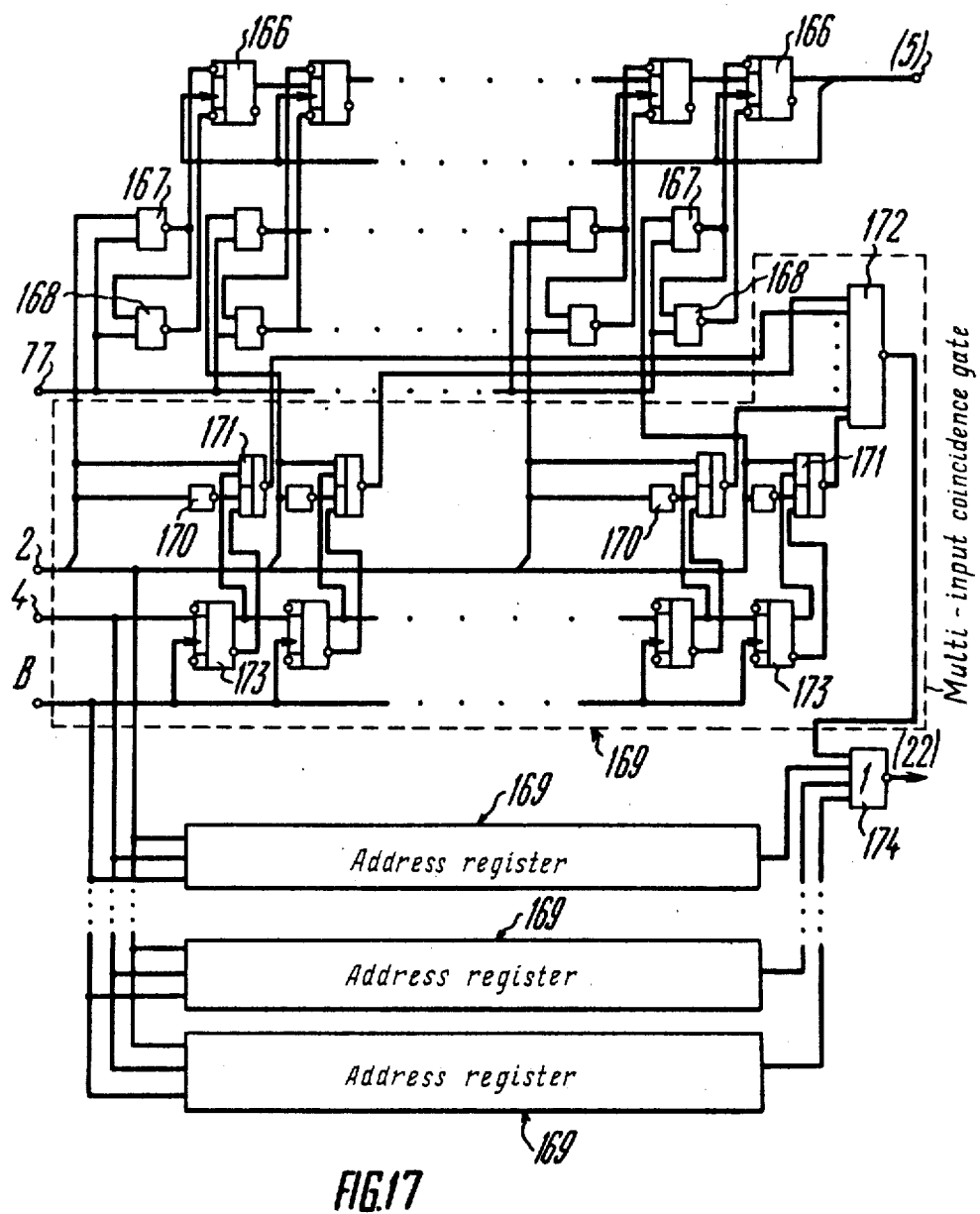
FIG. 17 is a key circuit diagram of an embodiment of the code addressing unit of the invention.

FIG. 17 shows the code addressing unit 3 (FIG. 1) which comprises an address output register built around flip-flops 166 and switching circuits having AND gates 167 and 168. The code addressing unit 3 address registers 169, each comprising coincidence gates corresponding to respective bits and built around a NOT gate 170 and an AND-to-AND-to-OR gates 171. The code addressing unit 3 also includes a multi-input coincidence gate 172, an address input register built around flip-flops 173 and an OR gate 174.

A synchronizing data address input B is connected to a data input/output control unit (not shown).

FIGS. 18a, 18b, 18c, 18e, 18g, 18h, 18k and 18q are time plots illustrating the process of data exchange between the central station and the peripheral stations wherein each is allotted certain periods of time, depending on the availability of data for transmission.

The system of the invention for an exchange of data between a central station and peripheral stations operates at follows. First, the synchronization of the central station and all the peripheral stations is considered.

The generator 21 (FIG. 1) of the central station produces regular pulses to synchronize operation of all the units of the central station. Using the synchronizing pulses of the generator 21 and signals applied to the pulse former 22 from the code addressing unit 3, the decoder 17 and the data availability signal discriminator 144, which necessitate the allocation of periods of time for the reception and/or transmission of data and the duration of those periods, said pulse former produces a train of synchronizing address pulses and synchronizing data pulses.

The generator 1 uses the synchronizing address pulses to generate an address signal which is an address sequence, the elements of which are in a predetermined recurrence relation. This address includes M partially overlapping non-recurrent subsequences which designate the addresses of selected peripheral stations.

The transmitter 11 then uses certain elements of the address sequence produced by the generator 1 to produce elementary address signals. This is accomplished with the aid of a modulation technique. As each peripheral station is called on, only those elementary address signals are sent to the channel, which correspond to the non-overlapping portion of the subsequence.

At the same time, by using the aforementioned synchronizing data pulses produced by the pulse former 22 and the contents of the register 6, the coder 9 generates a sequence of data elements. The transmitter 11 then resorts to a modulation technique to produce elementary data signals from data elements produced by the coder 9. The elementary data signals are directed to the channel as a given peripheral station is called on.

Elementary data signals are formed by using modulation patterns and parameters that are different from those of elementary address signals. The elementary address signals and elementary data signals of a given peripheral station are transmitted successively as shown in FIG. 18a.

In the time plot of FIG. 18a $E_i$ designates groups of elementary address signals of i-th peripheral stations, which correspond to the non-overlapping portion of the address subsequence and i designates the series number of the address of a given peripheral station $i = 1, 2, \ldots, M$.

The groups $E_i$ contain s elementary address signals $l_1, \ldots, l_s$, where $s \leq 1$. In the illustrated embodiment, $s = 3$.

The time plot of FIG. 18a also shows a series, such as $D_{i+3}$, of elementary data signals $d_1, \ldots, d_m$, transmitted to the (i+3)rd peripheral station, m being the number of elementary signals in the series.

FIG. 18a also shows a time interval $H_i$ between the address signals $E_i$ and $e_{i+1}$, allotted to transmit the data series $D_i$ (FIG. 18c) from the i-th peripheral station to the central station. The time interval $H_i$ may also be filled with elementary test signals if there is no data to be transmitted to a given station.

Thus, an exchange of data between the central station and a plurality of peripheral stations through a multiplex channel, which is common for the plurality of peripheral stations, only takes as much time as is required to transmit the address groups $E_i$ and $E_{i+1}$ and the data series D. This permits the transmission time to be minimized, because no time is alloted to peripheral stations which have nothing to transmit. The time it takes to transmit the address groups $E_i$ is thus much shorter than the data transmission time. As a result, the multiplex channel can readily adapt itself to a random stream of data.

The time it takes to transmit the address groups $E_i$ is reduced with an increase in the activity of the peripheral stations to a value which, for the illustrated embodiment is equal to (s/m). The result is an increased throughput of the multiplex channel which can cater to a greater number of peripheral stations and speedier and less expensive data transmission.

From the multiplex channel, the elementary signals reach the receivers 30 of all the peripheral stations, where synchronizing pulses are discriminated from these signals. The synchronizing pulses are applied to the synchronizing regular pulse generator 44 which automatically adjusts the time or phase delay and the repetition frequence of the synchronizing pulses, thus compensating for the channel noise and instability of the system's units.

The synchronizer regular pulse generator 44 is thus made synchronous and cophasal with the regular synchronizer pulse generator 21 (FIG. 1) of the central station and produces regular pulses to synchronize operation of all the units of each peripheral station.

The elementary address signals are demoulated by the receiver 30 and applied to the input 50 (FIG. 2) of the active recurrence sequence filter 46 which accumulates address subsequence elements.

As the system is started and when the address sequence becomes out of phase, the phase of the filter 46 is set automatically with reference to the address sequence recieved from the channel, whereupon the phase of the address sequence is continuously monitored and maintained by making sure that the address signal elements arriving from the channel correspond to the preset recurrence relation.

The filter 46 is synchronized by pulses generated by the discriminator 49 which discriminates synchronizing address pulses from the regular synchronizing pulse sequence applied to the input 58 and elementary address signals applied to the input 59. The reproduction of address sequence by the filters 46 of all the peripheral stations is thus synchronous and cophasal with the recurrence of sequence generator 1 (FIG. 1) of the central station.

The address selector 47 compares the address subsequence elements accumulated in the filters 46 (FIG. 2) with the address of a given peripheral station. The exchange of data is made possible if the accumulated address subsequence elements coincide with the address of a given peripheral station, and if there are enable signals at the inputs 114 and 148.

An exchange of data at the central station between this station and a given peripheral station is enabled by the code addressing unit 3 (FIG. 1) if the address subsequence at the output of the recurrence sequence generator 1 coincides with the address of a given peripheral station, stored in said unit.

The way data is transmitted from the central station to a given peripheral station, for example, the (i+3)rd peripheral station is now considered. The data intended for transmission to the (i+3)rd peripheral station is entered via the input 17 in a vacant location of the data input register 6. The address of the (i+3)rd peripheral station is entered via the input 4 in a respective vacant register of the code addressing unit 3.

Each location of the data input register 6 corresponds to a single register of the code addressing unit 3. Whenever a signal enabling the exchange of data between the central station and the (i+3)rd peripheral station is applied to the input 23 of the pulse former 22, said pulse former produces synchronizing data pulses which are applied to the inputs 25 and 26 of the data input register 6 and coder 9, respectively, whereby data is transmitted from said register to said coder and on to the transmitter 11 which produces elementary data signals to be sent, in turn, to the channel.

As soon as the address selector 47 (FIG. 2) of the (i+3)rd peripheral station produces a signal enabling the exchange of data between this peripheral station and the central station, and applies it to the input 53 of the controlled pulse former 51, said controlled pulse former produces synchronizing pulses of the data to be received. These synchronizing pulses are applied to the input 54 of the decoder 33 and to the input 55 of the register 35. The decoder 33 decodes the data arriving from the output of the receiver 30 and sends the data on to the data output register 35. If no error is found in the data by the decoder 33, the data is sent to the user via the output 36 of the register 35.

If there is an error, the data is retransmitted from the central station to the peripheral station by using one of the known methods. This is carried out with the aid of an automatic error interrogation unit (not shown).

The transmission of data from the ith peripheral station is now considered. Data intended for transmission to the central station is entered through the input 43 of the data input register 42 and stored there until the address selector 47 provides a data exchange enabling signal.

A data availability signal is applied from the data input register 42 to the data availability signal former 143, whereby said signal former is prepared for operation. Upon the arrival of an enabling signal, the controlled pulse former 51 produces synchronizing pulses applied to the data availability signal former 143 which produces a data availability signal. This signal is applied to the input 39 of the transmitter 37, modulated and sent to the channel via the output 38. In the time plot of FIG. 18c, this signal is designated as $P_i$. It consists of elementary signals $p_1, \ldots, p_s$.

The signal s is demodulated in the receiver 19 (FIG. 1) and applied to the data availability signal discriminator 144. Synchronizing pulses of the data availability signal are applied to the second input of the data availability signal discriminator 144 from the output of the pulse former 22. A data availability signal is thereby discriminated and produced at the output of the data availability signal discriminator 144.

The foregoing signal is applied to the pulse former 22, whereby said pulse former produces synchronizing pulses for the reception of data from the ith peripheral station, which means that a period of time $H_i$ (FIG. 18a) is alloted to the peripheral station for the exchange of data.

As the time $H_i$ is allotted to the ith peripheral station, the controlled pulse former 51 (FIG. 2) of this station produces synchronizing data transmission pulses. The controlled pulse former 51 establishes the fact of allotting the time $H_i$ to the peripheral station by analyzing the time intervals between the address groups $E_i$ (FIG. 18a) and $E_{i+1}$.

As synchronizing data transmission pulses are produced at the output of the controlled pulse former 51 (FIG. 2), the data is entered from the data input register 42 in the coder 40 and then sent to the transmitter 37 where the data is modulated and sent to the channel.

FIG. 18b shows a series of data $D_i$. The data is sent from the channel to the input of the receiver 19 (FIG. 1) of the central station, where it is demodulated and sent on to the decoder 17 and the data output register 14 with the aid of the aforesaid synchronizing data reception pulses produced by the pulse former 22 and applied to the inputs 27 and 28.

If the decoder 17 finds no error in the data, a data output enabling signal is applied from the output 72 of the decoder 17 to the pulse former 22. In response the pulse former 22 produces a signal applied to the input 77 of the pulse unit 3, whereby at the output 5 of said code addressing unit there is produced the address of the ith station. At the same time, data for the user is applied to the output 15. The same enabling signal causes the pulse former 22 to produce synchronizing address pulses for the next, (i+1)st, peripheral station.

If an error is found in the data by the decoder 17, no data output can occur, and the data is retransmitted by using some known technique. Retransmission units are not shown in the drawings.

If a peripheral station has no data for transmission, it produces a no data signal with the aid of synchronizing pulses applied to the input of the data availability signal former 143. These signals are presented in the accompanying time plots, where FIG. 18b shows the signal $p_{i-1}$, FIG. 18e shows the signal $p_{i+1}$, FIG. 18g shows the signal $p_{i+2}$, FIG. 18h shows the signal $p_{i+3}$ FIG. 18k shows the signal $p_{i+4}$ and FIG. 18q shows the signal $p_{i+5}$.

No data signals of a given station are discriminated by the data availability signal discriminator 144 of the central station and applied to the pulse former 22. If, at the same time, there is no data to be transmitted to this peripheral station, synchronizing address pulses are produced for the next-succeeding peripheral station, whereas no synchronizing data reception pulses are produced for the next-succeeding peripheral station. Thus, no time is provided to the preceeding station for an exchange of data, as shown, for example, in FIGS. 18a and 18g related to the (i+2)nd peripheral station.

If there is data for transmission from a given peripheral station to the central station and from the central station to this peripheral station, duplexing is resorted to. That is, simultaneous two-way data transmission between terminals is provided. The transmission of data in each direction is carried out independently in the aforedescribed manner.

The manner in which the system of the invention ensures a high accuracy of data transmission is described as follows. First, it is essential to ensure a high accuracy of address signals transmission, keeping in mind that there are only a limited number of elementary address signals $l_1 \ldots, l_s$ (FIG. 18a) for each address.

The problem is solved as follows. Apart from providing elementary address signals, data transmitting stations use their coders 9 (FIG. 1) or 40 (FIG. 2) to perform an additional operation of entering the information on the address of a given peripheral station in the data series D. This is accomplished by coding, without changing the contents of the data or the duration of the series D.

The receiving station uses the decoder 17 (FIG. 1) or 33 (FIG. 2) to separate the data from the address of the peripheral station. The decoder 17 (FIG. 1) or 33 (FIG. 2) compares this address with the actual address of a given peripheral station. A data output enabling signal is produced only if the two addresses fully coincide. The coder 9 (FIG. 1) or 40 (FIG. 2) may ensure noise-proof coding of the information on the address of a given peripheral station. This improves the accuracy of the address signals transmission.

A high accuracy of the address signals transmission is further accounted for by the fact that the filter of each peripheral station is the active recurrence sequence filter 46 which generates an address signal as a sequence similar to the sequence generated by the recurrence sequence generator 1 (FIG. 1) of the central station. The recurrence sequence filter 46 (FIG. 2) then multiplies this address signal by the address signal of the central station, separated by the receiver 30. The result of the multiplication is used for phasing and synchronizing the active recurrence sequence filter 46. The address selector 47 enables the exchange of data only if the input 114 receives a signal as to the phasing and synchronization of the active filter 46.

A high accuracy of the address signals transmission is also due to the facts that the number of elements in the address subsequences accumulated in the recurrence sequence filter 46 of each peripheral station and designating the addresses of peripheral stations is greater than a minimum number N of non-recurrent subsequences and that the number of elements in the address groups $E_i$ (FIG. 18a), where i = 1, 2, ..., M, is equal to or greater than unity. As a result, the subsequences, which designate the addresses of peripheral stations, constitute an excess noise-proof code set.

A high accuracy of the address signal transmission is also due to the fact that the controlled pulse former 51 (FIG. 2) of each peripheral station produces an enabled sequence of synchronizing address pulses which corresponds to the formats of the address groups E (FIG. 18a) and data series D used in the system. This enabled sequence is compared by the synchronizing address pulse checking circuit 145 (FIG. 2) with the sequence of synchronizing address pulses discriminated by the synchronizing address pulse discriminator 49. The synchronizing address pulse checking circuit 145 produces an enable signal which is applied to the input 148 of the address selector 47. The address selector 47 enables the exchange of data only in the presence of such an enable signal, which the avoidance of such errors as inserts or omissions of elements.

Thus, apart from ensuring a high throughput of the multiplex channel, the system of the invention also features a high data transmission accuracy, or, more precisely, a high accuracy of the address signals transmission. Operation of some individual units of the system is now considered. The operation of the pulse former 22 (FIG. 3) is based on control of the distributor 60 which produces synchronizing address pulses and synchronizing data availability pulses, and on the control of the distributor 67 which produces synchronizing data reception/transmission pulses with the aid of the setting units 61 and 69. By connecting the output of the flip-flop $60_s$ to the input of the flip-flop $61_1$, the setting unit 61 allocates a period of time for reception or transmission of data if the inputs of the gate 64 receive signals from the output of the code addressing unit 3 (FIG. 1) as to the presence of data to be transmitted from the central station, and/or signals from the output of the decoder 17, which necessitate a retransmission of the data.

The setting unit 61 (FIG. 3) utilizing the connection between the AND gate 62 and the OR gate 66 to produce synchronizing pulses of the next address unless no signals are applied to the inputs of the OR gate 64. The setting unit 69 utilizes the connection between the AND gate 70 and the OR gate 66 to produce synchronizing pulses of the next address if an enable signal is applied to the input of the AND gate 71 from the decoder 17 (FIG. 1). The setting unit 69 also uses the connection between the AND gate 71 and the OR gate 74 to produce synchronizing data pulses unless no signal is applied to the input of the gate 71. An address readout signal is applied from the output of the AND gate 70 to the input 77 of the code addressing unit 3 (FIG. 1).

The operation of the controlled former 51 (FIG. 4) is based on the control of the distributor 79 which produces synchronizing data availability pulses, and on the control of the distributor 89 which produces synchronizing data reception/transmission pulses with the aid of the controlled setting units 61 and 69 and the control signals applied to the set inputs of the flip-flops $80_1, \ldots, 80_s$ and $88_1, \ldots, 88_m$ from the discriminator 49.

Figure 4:
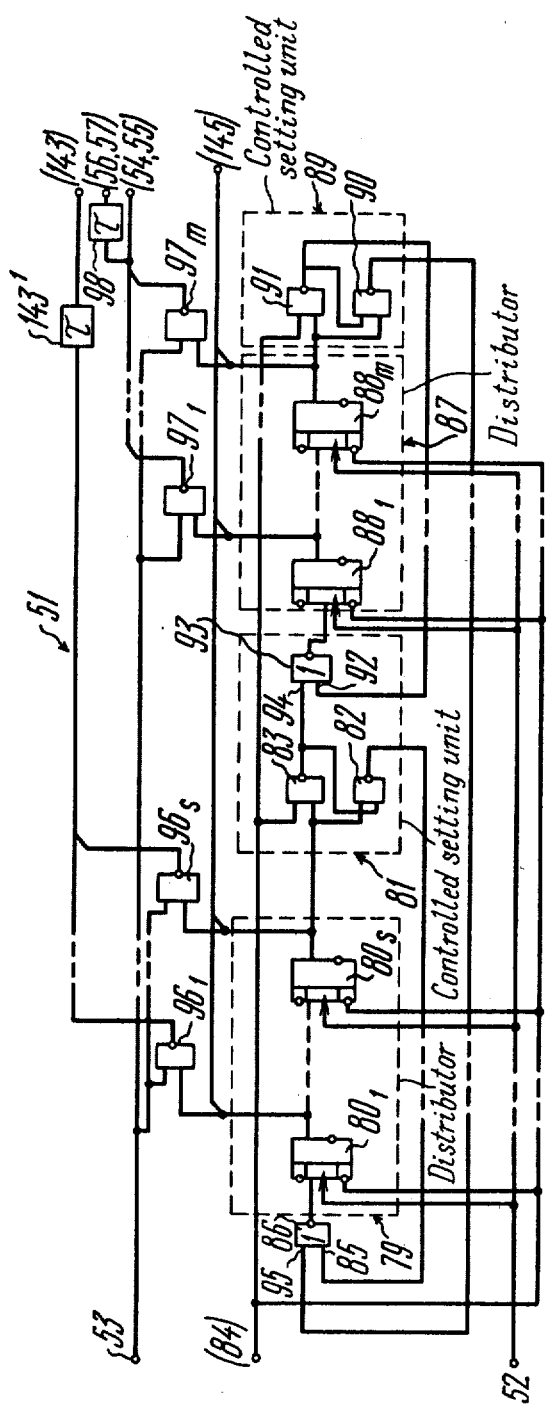
FIG. 4 is a functional circuit diagram of an embodiment of the controlled pulse former of the invention for forming an irregular sequence of pulses.

If the output of the flip-flop $80_s$ is connected to the input of the flip-flop $88_1$, the setting unit 81 (FIG. 4) produces synchronizing data reception/transmission pulses unless the input of the AND gate 83 thereof receives a synchronizing address pulse discriminated by the discriminator 49 (FIG. 2). The setting unit 81 also utilizes the connection between the AND gate 82 and the OR gate 86 to produce synchronizing data availability pulses for the next station if a discriminated synchronizing address pulse is applied to the input of the AND gate 83 (FIG. 4).

The setting unit 89 utilizes the connection between the AND gate 90 and the OR gate 93 to repeatedly produce synchronizing data reception/transmission pulses unless no discriminated synchronizing address pulse is applied to the input of the AND gate 91. On the contrary, if such a pulse is applied to the input of the AND gate 91, the setting unit 89 uses the connection between the AND gate 90 and the OR gate 86 to produce synchronizing data availability pulses for the next station.

Synchronizing pulses for an exchange of data for a given peripheral station are formed only in the presence of an enable signal at the input 53, which is provided for by the switching circuits $96_1, \ldots, 96_s$ and $97_1, \ldots, 97_m$. An enabled sequence of synchronizing address pulses and synchronizing data pulses is derived from the outputs of the flip-flops $80_1, \ldots, 80_s$ and some of the flip-flops $88_1, \ldots, 88_m$. The enabled sequence of synchronizing address pulses and data pulses is applied to the synchronizing address pulse checking circuit 145 (FIG. 2). Those of the flip-flops $88_1, \ldots, 88_m$, which come into play, are selected in dependence upon the formats of address groups and data series used in the system.

The recurrence sequence filter 46 (FIG. 5) operates as follows. First, the automatic phasing circuit 102 breaks the feedback loop 101 of the generator. This is achieved before the generator is synchronized and phased, as indicated by the absence of a signal at the output of the decoder 109. The input of the generator is connected via the AND-to-AND-to-OR gate 103 to the input 50 of the recurrence sequence filter 46.

Elementary address signals, discriminated by the receiver 30 (FIG. 2), are entered in the flip-flops 99 (FIG. 5) of the generator which produces a respective sequence. The AND-to-AND-to-OR gate compares the signals arriving from the loop 101 with those discriminated from the channel. The result of the comparison is applied to the shift register 107 and to one of the inputs of the reversible counter 108 which counts the number of elementary signals which do not match. The number stored by the counter 108 determines the correlation function of the sequences. The decoder 109 analyzes the actual value of the mutual correlation function. Dependent upon the results of the analysis, the decoder 109 produces a signal which closes the feedback loop 101 of the generator after said generator has been synchronized and phased. An enable signal to be applied to the input 114 of the address selector 47 (FIG. 2) is also produced on the basis of the analysis of the mutual correlation function.

The coder 9 (or 40) (FIG. 6) operates in a special way in the sense that prior to coding a sequence of data, information on the address of a given peripheral station is entered in the flip-flops 119 via the AND gates 115 and 116. The information arrives from the output 117 of the generator 1 (FIG. 1) or from the output 118 of the recurrence sequence filter 46 (FIG. 2). The information on the address of a given peripheral station is subjected to noise-proof coding (the coding circuit is not shown in FIG. 6).

Prior to decoding the data sequence by the decoder 17 (or 33) (FIG. 7), the information on the address of the selected peripheral station is entered in the flip-flops 132 via the AND gates 130 and 131. Only when the information on the address of the peripheral station, entered in the flip-flops 119 (FIG. 6) and flip-flops 132 (FIG. 7), coincides and no error is detected in the data, is an enable signal produced at the output of the decoder 134.

FIG. 8 shows an alternative embodiment of the decoder 17 (or 33), wherein no information on the address of a given peripheral station is entered in the flip-flops 132 prior to decoding. If no error is found in the data and when the decoding of the data series is completed, the flip-flops 132 retain information on the address of the peripheral station. If there is no mistake in the address either, the information entered in the flip-flops 132 coincides with the information arriving from the output 117 (or 118). As a result, the AND-to-AND-to-OR gates are brought into play, and an enable signal is produced at the output of the decoder 138.

A specific feature of the alternative embodiment of the coder 9 (or 40) shown in FIG. 9 is the sequence of data produced at the output of the data coder, that is, the OR gate 128, is added by the module two adder 139 to the information on the address of a given peripheral station, coded by the address coder built around the flip-flops 140. The elementary signals applied to the inputs 10 (or 39) are thus a modulo two sum of the respective elementary data signals and elementary address signals.

FIG. 10 shows an alternative embodiment of the decoder 17 (or 33) operating in conjunction with the coder 9 (or 40) of FIG. 9. This version of the decoder 17 (or 33) is special, since elementary signals applied to its input 18 (or 32) are sent to the first input of the adder 142. The second input of the adder 142 receives information on the address of a given peripheral station, which is coded by the address coder built around the flip-flops 141. As a result, the original sequence of coded elementary data signals, is produced at the output of the adder 142 and is applied to the input of the decoder, that is, to the adder 133, to be decoded in a conventional manner. At the same time, the elementary data signals are applied from the output of the adder 142 to the register 14 (or 35).

The decoder 138 produces an enable signal only if the information on the address of a given peripheral station, arriving from the flip-flops 141, coincides with the information arriving from the flip-flops 140 (FIG. 9) and if no error is detected in the data. The address coder is a register built around the flip-flop 141 or 140 (FIG. 9), because the subsequences designating the addresses of peripheral stations are an excess noise-proof code set. Other types of address coders may also be used.

An example of data conversion carried out by the coder 9 (or 40) and decoder 17 (or 33) (FIG. 10) is now considered.

Data elements, designated as $v_1, \ldots, v_j, \ldots, v_n$, are applied from the data input register 6 (or 42) (FIG. 9) to the input of the data coder, that is, the AND gates 122 and 124. The sequence $$v_1, \ldots, v_j, \ldots, v_n, w_{n+1}, \ldots, w_m, \quad (1)$$

is produced at the output of the coder, that is, the OR gate 128, where $j=1, 2, \ldots, m$. Test elements $w_{n+1}, \ldots, w_m$ produced by the coder are added to this sequence. This sequence is applied to the first imput of the adder 139. The subsequence $$e_1^v, \ldots, e_s^v, \ldots, e_1^{i-1}, \ldots, e_g^{i-1}, \ldots, e_1^i, \ldots, e_s^i \quad (2)$$

is applied to the second input of the adder 139 from the output of the address coder. This subsequence designates the address of a given peripheral station and contains elementary address signals whose number is equal to:

$$[i-(v-1)]s = r \quad (3)$$

It is assumed that $r = m$.

A sequence of elementary signals:

$$d'_1, \ldots, d'_j, \ldots, d'_m \quad (4)$$

The coincidence check unit 149 (FIG. 11) is an AND gate which resets the flip-flops are a modulo two sum of the respective elements of (1) and (2). That is, $$\left. \begin{array}{l} d_1 = V_1 \oplus e_1^v \\ \vdots \\ d_j = V_j \oplus e_j^v \\ \vdots \\ d_m = W_m \oplus e_s^i \end{array} \right\} \quad (5)$$

The sequence (4) is applied to the transmitter 11 (FIG. 1) or 37 (FIG. 2) and sent to the channel.

The receiver 30 or receiver 19 (FIG. 1) discriminate the sequence of elementary signals:

$$d''_1, \ldots, d''_j, \ldots, d''_m \quad (6)$$

which is applied to the input of the adder 142 (FIG. 10). The second input of the adder 142 receives a subsequence arriving from the address coder built around the flip-flops 141. This subsequence coincides with the subsequence (2) only when there is no error in the address. The following sequence is produced at the output of the adder 142

$$v''_1, \ldots, v''_j, \ldots, v''_n, w''_{n+1}, \ldots, w''_m \quad (7)$$

This sequence coincides with the original subsequence (1) only if the address and data are free from errors. The elements of this subsequence are described as follows:

$$\left. \begin{array}{l} V''_1 = d''_1 \oplus e_1^v = (V_1 \oplus e_1^v) \oplus e_1^v = V_1 \\ \vdots \\ V''_j = d''_j \oplus e_j^v = (V_j \oplus e_j^v) \oplus e_j^v = V_j \\ \vdots \\ W''_m = d''_m \oplus e_s^i = (W_m \oplus e_s^i) \oplus e_s^i = W_m \end{array} \right\} \quad (8)$$

However, if there are errors in the address or in the data, or in both the address and the data, not all of the equations (3) are complied with. The decoder detects the error and no enable signal is produced by the decoder 138.

The synchronizing address pulse checking circuit 145 (FIG. 11) enables the address selector 148 (FIG. 2) to produce a signal only after at least a predetermined number of pulses of two irregular subsequences, arriving at its inputs, coincide in time, and only if not more than another predetermined number of pulses do not coincide in time. In the present example, the latter number of pulses is zero.

The interlocking circuit 147 discontinues the operation of the counter built around the flip-flops 146 upon reaching a preset number of pulses. The coincidence check unit 149 (FIG. 11) is an AND gate which resets the flip-flops 146 when the aforementioned sequences do not match.

Elementary data availability signals are applied to the data availability signal former 143 (FIG. 12) from the register 42 (FIG. 2) via the switching circuits. Upon the arrival from the controlled irregular sequence pulse former 51 of synchronizing data availability pulses, the elementary data availability signals are applied to the input 39 of the transmitter 37. The data availability signal discriminator 144 (FIG. 13) uses the synchronizing data availability pulses and derives the elementary data availability signals from the output of the receiver 19 (FIG. 1).

The foregoing description of the system of the invention clarifies the operation of the recurrence sequence generator 1.

The address selector 47 (FIG. 15) produces an enable signal at the output of the AND gate 162 if the following three conditions are met 1. The current address, stored in the recurrence sequence filter 46 (FIG. 2), coincides with the address assigned to a given peripheral station and applied to the input A (FIG. 15);
2. An enable signal arrives from the recurrence sequence filter 46 (FIG. 2).
3. An enable signal arrives from the synchronizing address pulse checking circuit 145.

The synchronizing address pulse discriminator 49 (FIG. 16) discriminates the synchronizing address pulses from the elementary address signals arriving from the output of the receiver 30 (FIG. 2).

The code addressing unit 3 (FIG. 17) compares the addresses of the data intended for transmission to certain peripheral stations with the addresses of these peripheral stations. The addresses are stored in the registers 169. The comparison is made at appropriately selected instants. The coincidence gates corresponding to individual bits check if the addresses coincide. If they do, an enable signal is produced at the output of the OR gate 174. Simultaneously, the necessary data is transmitted from the data input register 6 (FIG. 1) to a given peripheral station. By using the register built around the flip-flops 166, the code addressing unit 3 (FIG. 17) forms the address of a selected peripheral station wherefrom data is received by a signal applied to the input 77.

The present invention permits an increase in the number of peripherals stations, provides for speedier transmission of data through multiplex channels and ensures highly accurate and inexpensive data transmission.

What is claimed is:

1. A method for an exchange of data through a channel between a central station and peripheral stations, which method comprises the steps of generating, at said central station, an address signal which is an address sequence including M non-recurrent subsequences designating the addresses of selected peripheral stations, wherein M is an integer, said address sequence having elements meeting a predetermined recurrence relation, and said subsequences which designate the addresses of two successive peripheral stations, being partially overlapping in time;

deriving elementary address signals indicating addresses and elementary data signals indicating data from some of said elements of said address sequence and from other control information elements;

transmitting from said central station to said channel, as each next peripheral station is called on, only those elementary address signals which correspond to the non-overlapping part of said subsequence designating the selected address of the next peripheral station;

providing a series of synchronizing address pulses for generating and transmitting from said central station the steps of said elementary address signals;

discriminating, at each peripheral station, said synchronizing address pulses and elements of the sequence being generated from said address signal;

accumulating the discriminated elements of the sequence being generated and producing a subsequence designating the address of a peripheral station from these elements; and comparing said subsequence elements with the address of one of said peripheral stations and enabling the exchange of data if said accumulated subsequence elements coincides with the address of a given peripheral station, the improvement consisting of providing modulation patterns and parameters at said central station to form said elementary signals of addresses of said peripheral stations from the elements of the subsequence;

providing different modulation patterns and parameters at said central station to form said elementary data signals;

successively transmitting from said central station the elementary address signals and elementary data signals of a given peripheral station;

determining at said central station the availability of data for transmission by setting intervals of time between successive elementary address signals depending on the availability of data for transmission from a given peripheral station to said central station and from said central station to a given peripheral station;

generating, at each peripheral station, an address signal similar to that generated at said central station, said address signal being a sequence having elements having a predetermined recurrence relation;

multiplying, at said peripheral station, said address signal of said peripheral station by the discriminated address signal of said central station and obtaining an error signal indicating an error in one of said address signals;

shifting the phrase of the address signal of said peripheral station with reference to the error signals obtained by the multiplication; and comparing the accumulated subsequence of elements of the phase-shifted address signal of a given peripheral station with said address of said peripheral station, whereby the accuracy of addressing peripheral stations during successive transmitting of elementary address and data signals is improved.

2. A method as claimed in claim 1, wherein the effectiveness of the use of said peripheral stations of the intervals of time between said elementary address signals as data is transmitted to a peripheral station at random intervals of time, is increased by successively forming, at each peripheral station and at a predetermined instant, a signal indicating the availability of data for transmission or a no data signal;

transmitting one of said signals to said channel;

receiving said one of said signals at said central station;

forming an elementary signal of the address of the next peripheral station;

transmitting the formed address signal to said channel depending on the availability of data for transmission from a given peripheral station to said central station and from said central station to said given peripheral station; and transmitting said formed address signal to said channel with different delays in relation to the elementary signal of the address of said given peripheral station.

3. A method as claimed in claim 1, wherein, apart from said elementary address signals, information on the address of a given peripheral station is additionally included in said elementary data signals, said subsequence which designates the address of said given peripheral station is added at said central station by coding data transmitted from said given peripheral station, without changing the contents of said data transmitted from said given peripheral station and without increasing the number of elementary data signals, and the station which receives the data discriminates by decoding, the data and the subsequence designating the address of said given peripheral station, whereupon said subsequence is compared with the current value of said address of said given peripheral station.

4. A method as claimed in claim 1, wherein the accuracy of addressing peripheral stations during successive transmitting of elementary address signals and elementary data signals is improved by providing and transmitting a number of elements of said sequences designating the addresses of said peripheral stations, said number of elements being greater than a minimum number N of said elements of said non-recurrent subsequences; and providing and transmitting a number of said elements in the non-overlapping part of said subsequence transmitted to said channel, said number being equal to at least unity.

5. A method as claimed in claim 1, wherein in the course of successive transmitting of said elementary address signals and elementary data signals, each of said peripheral stations produces enabled sequences of synchronizing address pulses and synchronizing data pulses corresponding to the formats of said address signals and data signals used in the exchange of data, whereupon said discriminated synchronizing address pulses and synchronizing data pulses are compared with said enabled sequences of synchronizing address pulses and synchronizing data pulses, the result of the comparison determining the exchange of data.

6. A method as claimed in claim 2, wherein, apart from said elementary address signals, said elementary data signals additionally include information on the address of a given peripheral station, said subsequence which designates the address of said given peripheral station being added by coding data transmitted from said given peripheral station, without changing the contents of said data transmitted from said given peripheral station and without increasing the number of elementary data signals; and then discriminating, by decoding, the data and the subsequence designating the address of said given peripheral station, whereupon said subsequence is compared with the current value of said address of said given peripheral station.

7. A method as claimed in claim 2, wherein the accuracy of addressing peripheral stations during successive transmitting of elementary address and data signals is improved by providing and transmitting a number of elements of said sequences designating the addresses of said peripheral stations, said number of elements being greater than a minimum number N of said elements of said non-recurrent subsequences; and receiving a number of said elements in the non-overlapping part of said subsequence transmitted to said channel, said number being at least equal to unity.

8. A method as claimed in claim 3, wherein the accuracy of addressing peripheral stations during successive transmitting of address and data signals is improved by providing and transmitting a number of elements of the sequences designating the addresses of said peripheral stations, said number of elements being greater than a minimum number N of said elements of said non-recurrent subsequences; and receiving a number of said elements in the non-overlapping part of said subsequences transmitted to said channel, said number being at least equal to unity.

9. A method as claimed in claim 4, wherein enabled sequences of synchronizing address pulses and synchronizing data pulses are produced at each of said peripheral stations during successive transmitting of said elementary address signals and said elementary data signals, said sequences corresponding to the formats of said address signals and data signals used in the exchange of data, whereupon the discriminated synchronizing address pulses and the discriminated synchronizing data pulses are compared with said enabled sequences of synchronizing address pulses and synchronizing data pulses, the result of the comparison determining the exchange of data.

* * * * *